United States Patent
Shim et al.

(10) Patent No.: US 12,526,749 B2
(45) Date of Patent: Jan. 13, 2026

(54) POWER CONTROL METHOD AND WIRELESS DEVICE USING SAME METHOD

(71) Applicant: LG ELECTRONICS INC., Seoul (KR)

(72) Inventors: Jaenam Shim, Seoul (KR); Hyunsoo Ko, Seoul (KR); Hyangsun You, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 533 days.

(21) Appl. No.: 18/019,456

(22) PCT Filed: Aug. 9, 2021

(86) PCT No.: PCT/KR2021/010496
§ 371 (c)(1),
(2) Date: Feb. 2, 2023

(87) PCT Pub. No.: WO2022/031144
PCT Pub. Date: Feb. 10, 2022

(65) Prior Publication Data
US 2023/0300755 A1    Sep. 21, 2023

(30) Foreign Application Priority Data

Aug. 7, 2020  (KR) .................. 10-2020-0099455
Jan. 13, 2021  (KR) .................. 10-2021-0004613
Jul. 30, 2021  (KR) .................. 10-2021-0100824

(51) Int. Cl.
*H04W 52/14*    (2009.01)
*H04W 52/24*    (2009.01)

(52) U.S. Cl.
CPC ....... *H04W 52/146* (2013.01); *H04W 52/243* (2013.01)

(58) Field of Classification Search
CPC . H04W 52/146; H04W 52/243; H04W 52/14; H04W 52/18; H04W 52/24;
(Continued)

(56) References Cited

U.S. PATENT DOCUMENTS

2016/0359608 A1* 12/2016 Noh ................ H04W 52/246
2017/0041118 A1*  2/2017 Liu ................. H04L 1/0009
(Continued)

FOREIGN PATENT DOCUMENTS

KR    10-2016-0099095 A    8/2016

OTHER PUBLICATIONS

CMCC, "Discussions on enhancements to support NR Backhaul links", R1-1812878, 3GPP TSG RAN WG1 Meeting #95, Spokane, USA, Nov. 12-16, 2018, see sections 2.2-3.
(Continued)

*Primary Examiner* — Fayyaz Alam
(74) *Attorney, Agent, or Firm* — BRYAN CAVE LEIGHTON PAISNER LLP

(57) ABSTRACT

The present disclosure proposes a power control method that can be used when performing simultaneous transmission and reception, such as full duplex. A power control method performed by a first wireless device, according to an embodiment of the present disclosure, comprises: measuring self-interference for uplink reception of the first wireless device; and transmitting power control request information to a second wireless device on the basis of the self-interference exceeding the allowable range, wherein the power control request information includes power control information for uplink transmission of the first wireless device.

14 Claims, 27 Drawing Sheets

(58) Field of Classification Search
CPC ..... H04W 52/36; H04W 52/38; H04W 72/04; H04W 84/04; H04W 52/245; H04W 52/365; H04W 52/46; H04W 84/047; H04W 92/20; Y02D 30/70
See application file for complete search history.

(56) References Cited

U.S. PATENT DOCUMENTS

| | | | |
|---|---|---|---|
| 2017/0302337 A1* | 10/2017 | Liu | H04L 5/14 |
| 2022/0124629 A1* | 4/2022 | Xing | H04W 52/02 |
| 2022/0247468 A1* | 8/2022 | Huang | H04W 24/10 |

OTHER PUBLICATIONS

LG Electronics, "Discussion on IAB enhancements", R1-1912266, 3GPP TSG RAN WG1 #99, Reno, USA, Nov. 18-22, 2019, see sections 2.1-3.

* cited by examiner

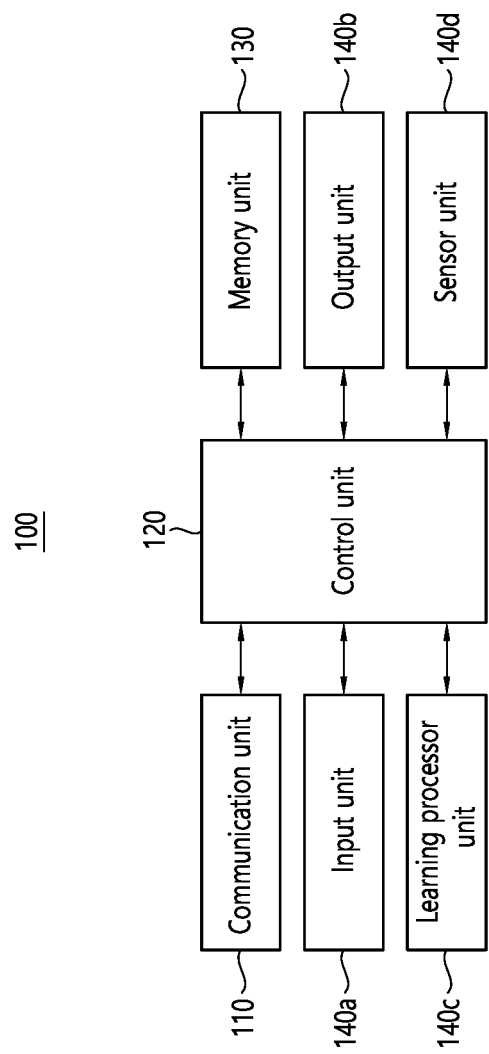

POWER CONTROL METHOD AND WIRELESS DEVICE USING SAME METHOD

CROSS REFERENCE TO RELATED APPLICATIONS

This application is the National Stage filing under 35 U.S.C. 371 of International Application No. PCT/KR2021/010496, filed on Aug. 9, 2021, which claims the benefit of and priority to Korean Application No. 10-2020-0099455, filed on Aug. 7, 2020, Korean Application No. 10-2021-0004613, filed on Jan. 13, 2021 and Korean Application No. 10-2021-0100824, filed on Jul. 30, 2021, the contents of which are all hereby incorporated by reference herein in their entirety.

TECHNICAL FIELD

The present disclosure relates to wireless communication.

BACKGROUND

One potential technology aimed at enabling future cellular network deployment scenarios and applications is support for wireless backhaul and relay links. This enables flexible and highly dense deployment of NR cells without the need to proportionally densify the transport network.

It is expected that greater bandwidth in NR compared to LTE with the native deployment of massive MIMO or multi-beam systems will be available. Thus (e.g., mmWave spectrum) creates opportunities for the development and deployment of integrated access and backhaul links. This makes it easier for a deployment of a dense network of self-backhauled NR cells in a more integrated manner by establishing multiple control and data channels/procedures defined to provide access or access to the terminals. Such systems are referred to as integrated access and backhaul links (IAB).

SUMMARY

The present specification proposes a power control method, and more particularly, a power control method that can be used when simultaneous transmission and reception, such as full-duplex or the like, are performed.

According to the present specification, it is possible to avoid an incorrect power headroom report and improper power control which may occur when simultaneous transmission and reception, such as full-duplex or the like, are performed, and it is possible to provide more efficient power distribution.

Effects that can be obtained through a specific example of the present specification are not limited to the aforementioned effects. For example, there may be various technical effects that can be understood or derived by a person having ordinary skill in the related art from the present specification. Accordingly, specific effects of the present specification are not limited to those explicitly described in the present specification, and may include various effects that can be understood or derived from technical features of the present specification.

BRIEF DESCRIPTION OF THE DRAWINGS

The following drawings were created to explain a specific example of the present specification. Since the names of specific devices described in the drawings or the names of specific signals/messages/fields are presented by way of example, the technical features of the present specification are not limited to the specific names used in the following drawings.

FIG. 27 shows an AI device, in accordance with an embodiment of the present disclosure.

DETAILED DESCRIPTION

As used herein, "A or B" may mean "only A", "only B", or "both A and B". That is, "A or B" may be interpreted as "A and/or B" herein. For example, "A, B or C" may mean "only A", "only B", "only C", or "any combination of A, B, and C".

As used herein, a slash (/) or a comma (,) may mean "and/or". For example, "A/B" may mean "A and/or B". Therefore, "A/B" may include "only A", "only B", or "both A and B". For example, "A, B, C" may mean "A, B, or C".

As used herein, "at least one of A and B" may mean "only A", "only B", or "both A and B". Further, as used herein, "at least one of A or B" or "at least one of A and/or B" may be interpreted equally as "at least one of A and B".

As used herein, "at least one of A, B, and C" may mean "only A", "only B", "only C", or "any combination of A, B, and C". Further, "at least one of A, B, or C" or "at least one of A, B, and/or C" may mean "at least one of A, B, and C".

As used herein, parentheses may mean "for example". For instance, the expression "control information (PDCCH)" may mean that a PDCCH is proposed as an example of control information. That is, control information is not limited to a PDCCH, but a PDCCH is proposed as an example of control information. Further, the expression "control information (i.e., a PDCCH)" may also mean that a PDCCH is proposed as an example of control information.

Technical features individually described within a drawing in the present disclosure may be implemented individually or may be implemented simultaneously.

Figure 1:
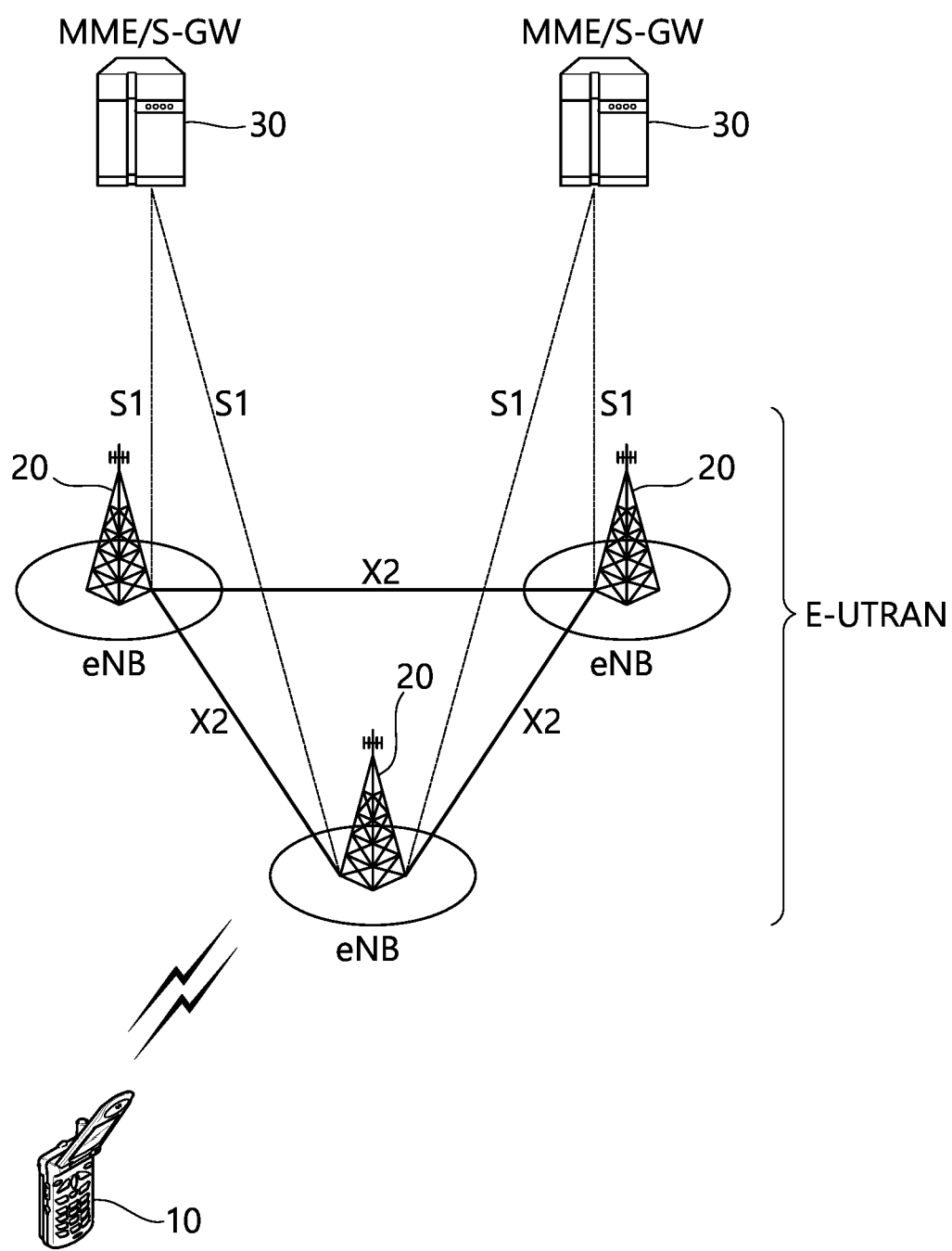
FIG. 1 shows a wireless communication system to which the present disclosure can be applied.

FIG. 1 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
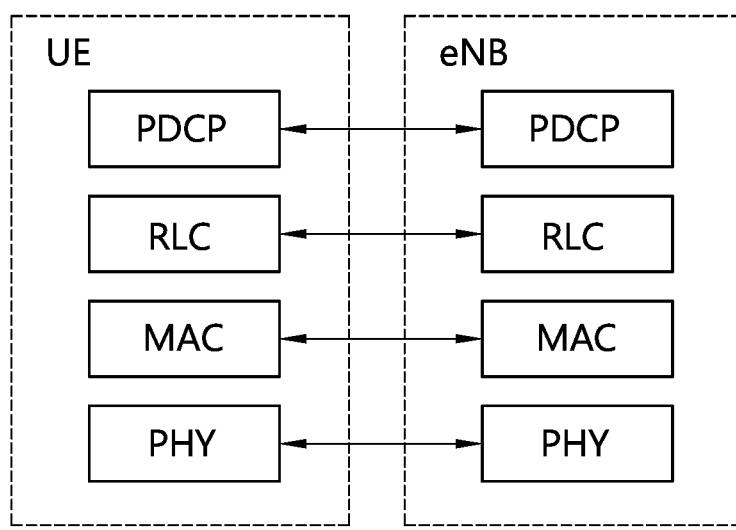
FIG. 2 is a diagram showing a wireless protocol architecture for a user plane.
Figure 3:
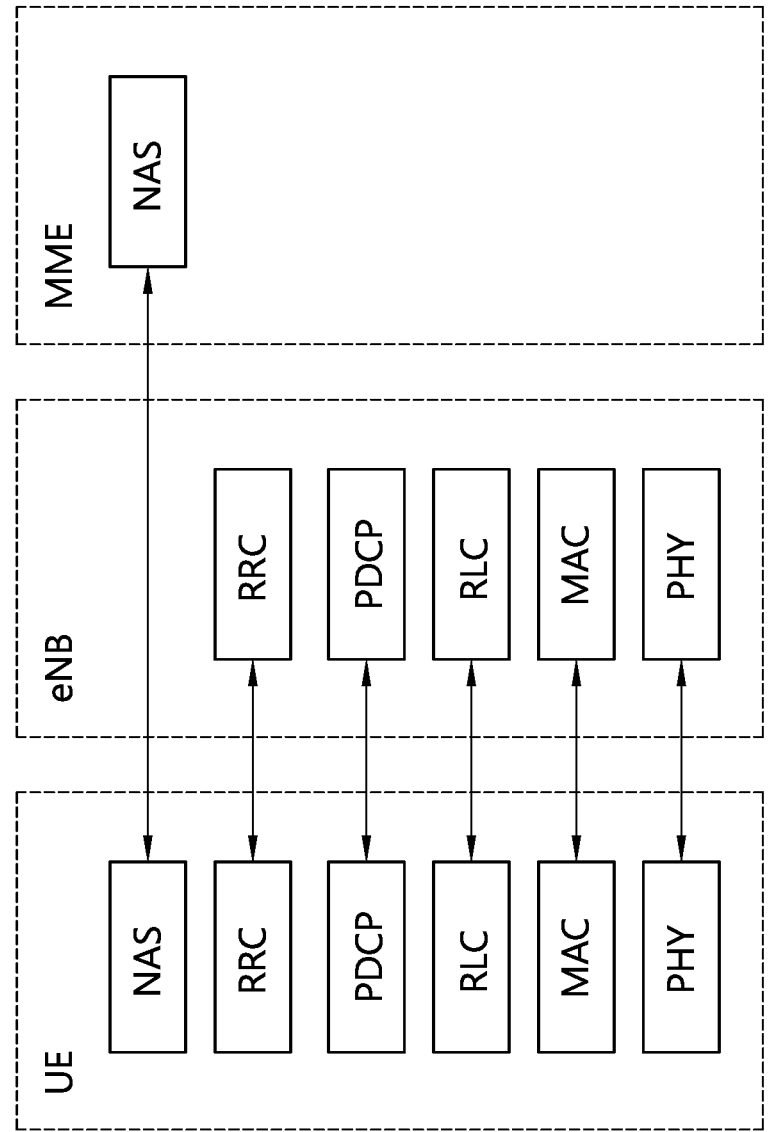
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for transmission, e.g., a subframe or a slot.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 4:
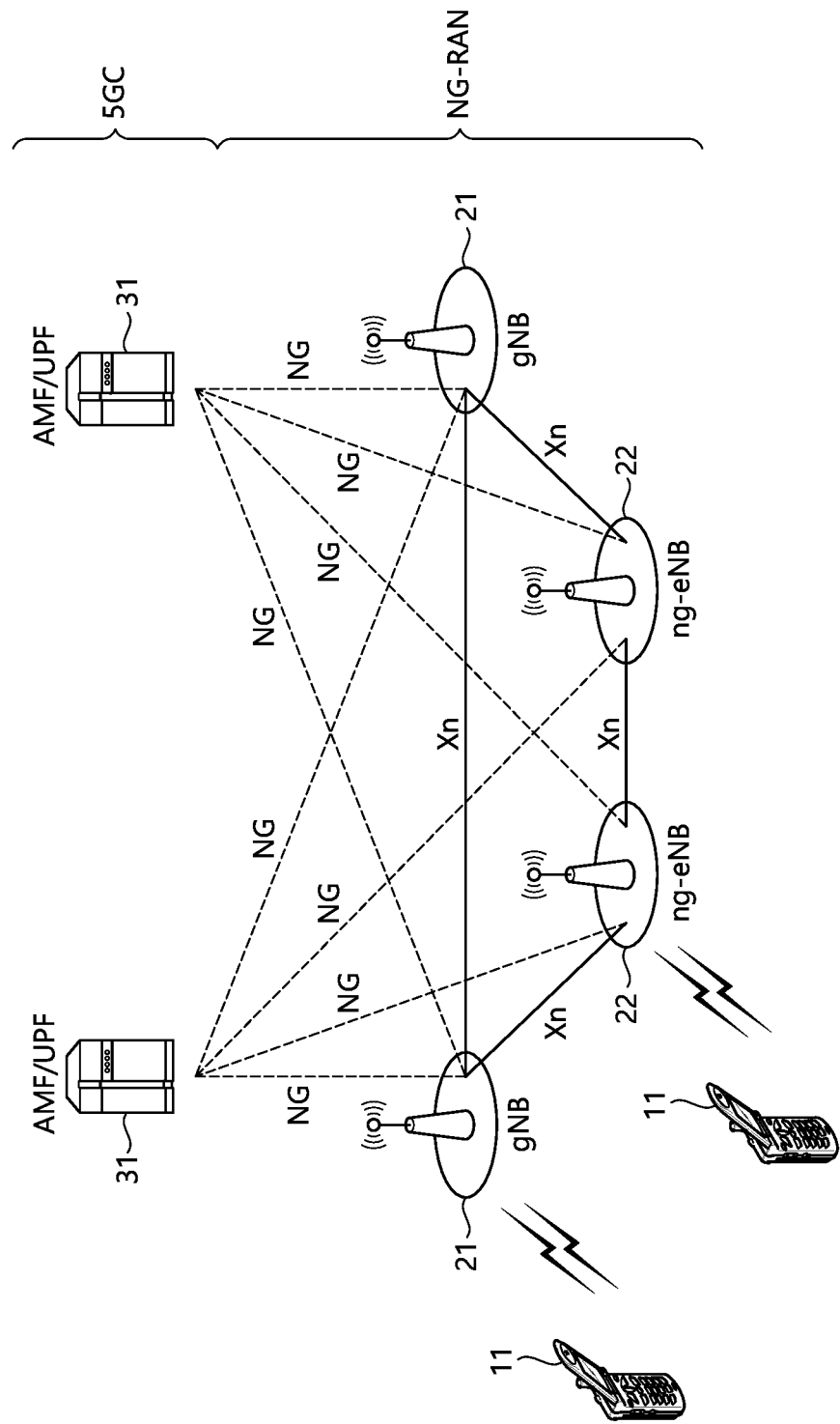
FIG. 4 shows another example of a wireless communication system to which the technical features of the present disclosure can be applied.

FIG. 4 shows another wireless communication system to which the present disclosure may be applied.

Specifically, FIG. 4 shows a system architecture based on a 5G new radio access technology (NR) system. An entity used in the 5G NR system (hereinafter, simply referred to as "NR") may absorb some or all functions of the entity (e.g., eNB, MME, S-GW) introduced in FIG. 1 (e.g., eNB, MME, S-GW). The entity used in the NR system may be identified in the name of "NG" to distinguish it from LTE.

Referring to FIG. 4, a wireless communication system includes one or more UEs 11, a next-generation RAN (NG-RAN), and a 5$^{th}$ generation core network (5GC). The NG-RAN consists of at least one NG-RAN node. The NG-RAN node is an entity corresponding to the BS 20 of FIG. 1. The NG-RAN node consists of at least one gNB 21 and/or at least one ng-eNB 22. The gNB 21 provides NR user plane and control plane protocol terminations towards the UE 11. The Ng-eNB 22 provides an E-UTRA user plane and a control plane protocol termination towards the UE 11.

The 5GC includes an access and mobility management function (AMF), a user plane function (UPF), and a session management function (SMF). The AMF hosts functions, such as non-access stratum (NAS) security, idle state mobility processing, and so on. The AMF is an entity including the conventional MMF function. The UPF hosts functions, such as mobility anchoring, protocol data unit (PDU) processing, and so on. The UPF is an entity including the conventional S-GW function. The SMF hosts functions, such as UE Internet Protocol (IP) address allocation, PDU session control, and so on.

The gNB and the ng-eNB are interconnected through an Xn interface. The gNB and the ng-eNB are also connected to the 5GC through an NG interface. More specifically, the gNB and the ng-eNB are connected to the AMF through an NG-C interface, and are connected to the UPF through an NG-U interface.

Figure 5:
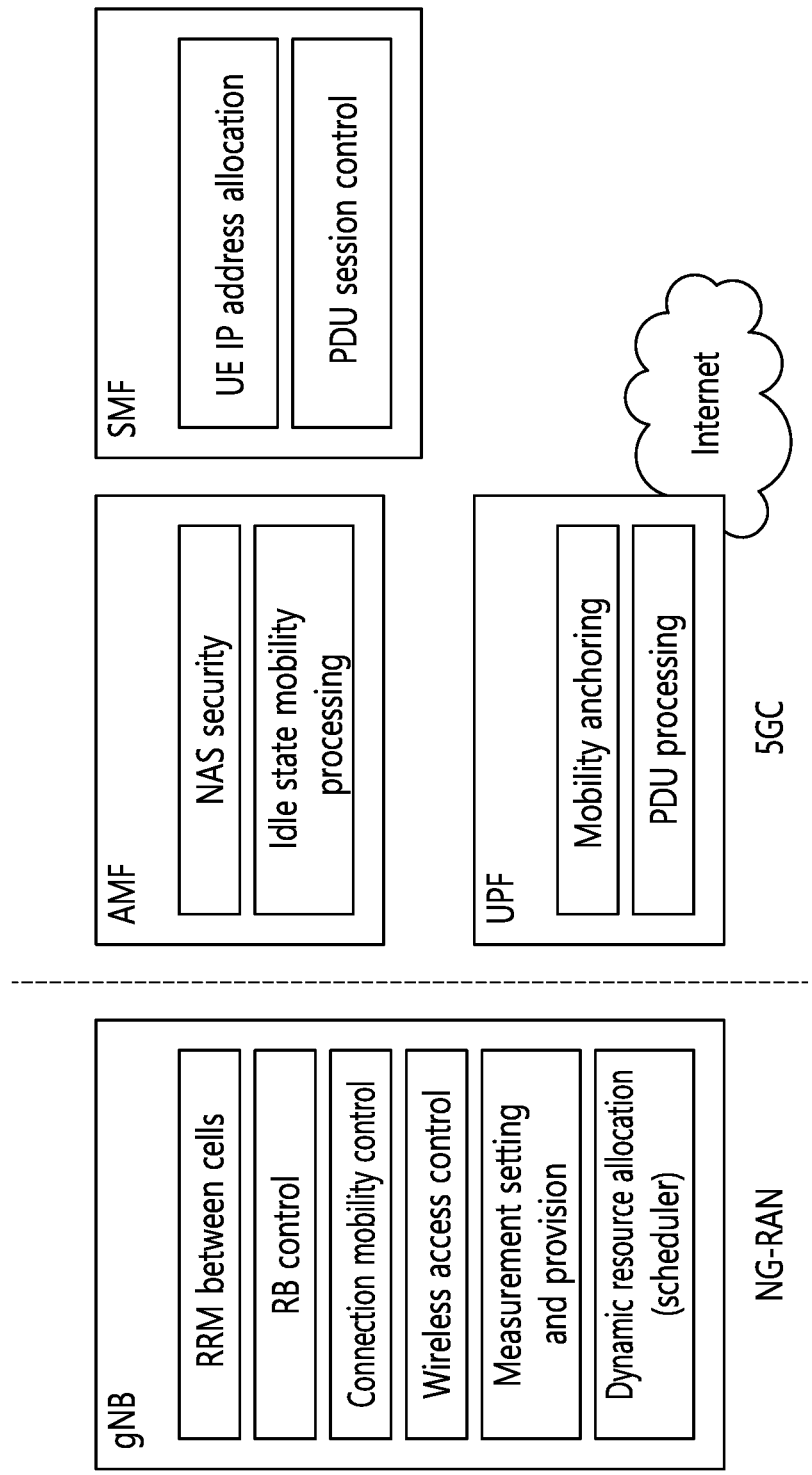
FIG. 5 illustrates a functional division between an NG-RAN and a 5GC.

FIG. 5 illustrates a functional division between an NG-RAN and a 5GC.

Referring to FIG. 5, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
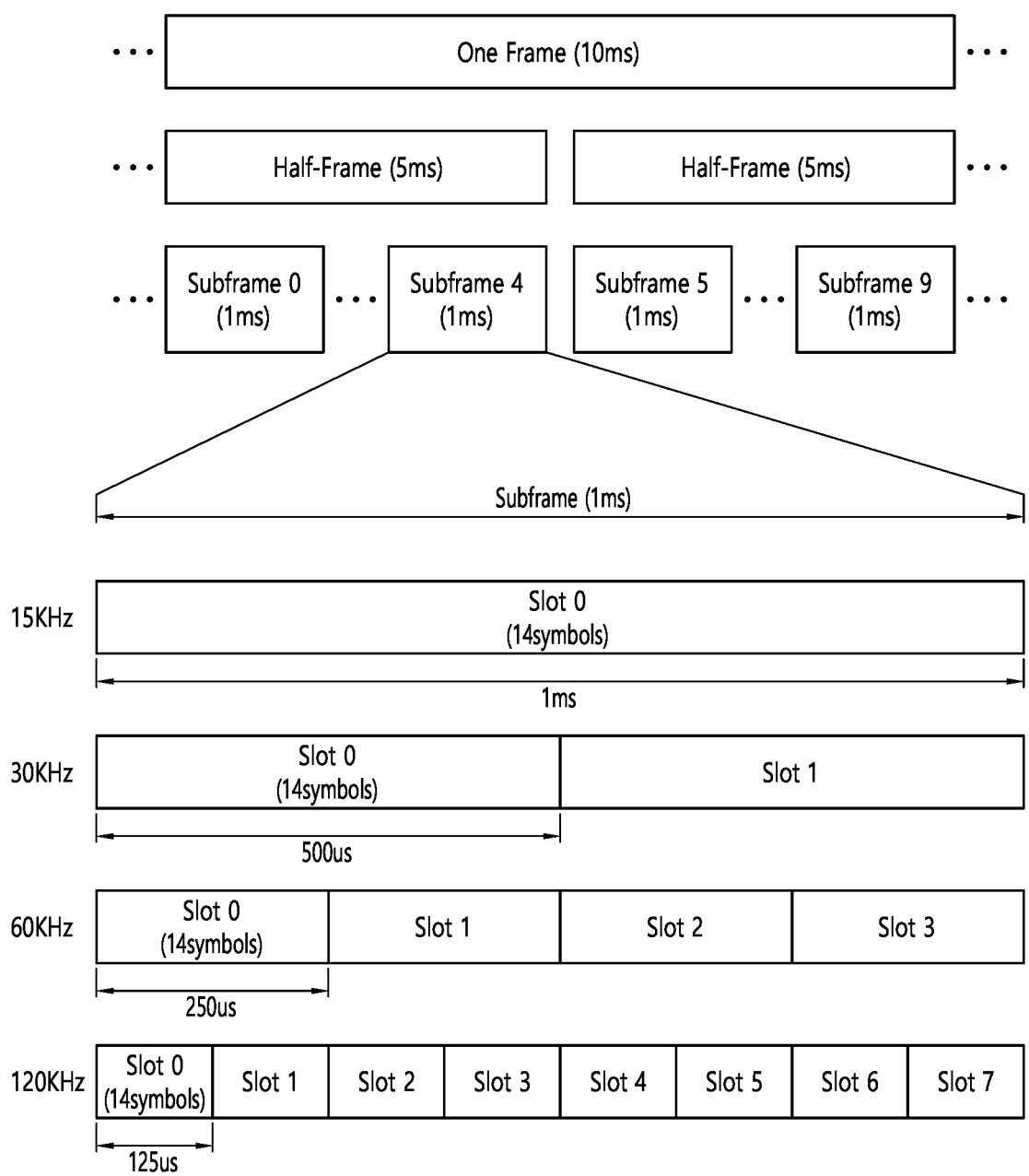
FIG. 6 illustrates an example of a frame structure that may be applied in NR.

FIG. 6 illustrates an example of a frame structure that may be applied in NR.

Referring to FIG. 6, a frame may be composed of 10 milliseconds (ms) and include 10 subframes each composed of 1 ms.

In the NR, uplink and downlink transmissions may be configured on a frame basis. A radio frame has a length of 10 ms, and may be defined as two 5 ms half-frames (HFs). The HF may be defined as five 1 ms sub-frames (SFs). The SF is divided into one or more slots, and the number of slots in the SF depends on a subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Herein, the symbol may include an OFDM symbol (or CP-OFDM symbol) and an SC-FDMA symbol (or DFT-S-OFDM symbol).

One or a plurality of slots may be included in a subframe according to subcarrier spacings.

The following table 1 illustrates a subcarrier spacing configuration $\mu$.

TABLE 1

| $\mu$ | $\Delta f = 2^{\mu} \cdot 15$ [kHz] | Cyclic prefix |
|---|---|---|
| 0 | 15 | Normal |
| 1 | 30 | Normal |
| 2 | 60 | Normal Extended |
| 3 | 120 | Normal |
| 4 | 240 | Normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations $\mu$.

TABLE 2

| $\mu$ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |

TABLE 2-continued

| μ | $N_{symb}^{slot}$ | $N_{slot}^{frame,\mu}$ | $N_{slot}^{subframe,\mu}$ |
|---|---|---|---|
| 3 | 14 | 80 | 8 |
| 4 | 14 | 160 | 16 |

Table 3 below illustrates that the number of symbols per slot, the number of slots per frame, and the number of slots per subframe vary depending on the SCS, in case of using an extended CP.

TABLE 3

| SCS(15 * 2^μ) | $N_{symb}^{slot}$ | $N_{slot}^{frame,u}$ | $N_{slot}^{subframe,u}$ |
|---|---|---|---|
| 60 KHz (μ = 2) | 12 | 40 | 4 |

NR supports multiple numbers (or subcarrier spacing (SCS)) to support various 5G services. For example, when the SCS is 15 kHz, a wide region in the legacy cellular band is supported; and when the SCS is 30 kHz/60 kHz, dense urban areas, low time delay and wide carrier bandwidth are supported; and when the SCS is 60 kHz or more, a bandwidth of more than 24.25 GHz is supported in order to overcome phase noise.

The NR frequency band may be defined as two types of frequency ranges (FR1 and FR2). A numerical value of the frequency range may be changed and, for example, the two types of frequency ranges (FR1 and FR2) may be as shown in Table 4 below. For convenience of explanation, among the frequency ranges used in the NR system, FR1 may refer to "sub 6 GHz range" and FR2 may refer to "above 6 GHz range" and may be called millimeter wave (mmW).

TABLE 4

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHZ | 60, 120, 240 kHz |

As described above, the numerical value of the frequency range of the NR system may be changed. For example, FR1 may include a band of 410 MHz to 7125 MHz as shown in Table 5 below. That is, FR1 may include a frequency band of 6 GHz (or 5850, 5900, 5925 MHz, etc.) or higher. For example, the frequency band of 6 GHz (or 5850, 5900, 5925 MHz, etc.) or higher included in FR1 may include an unlicensed band. The unlicensed band may be used for various purposes, for example, for communication for a vehicle (e.g., autonomous driving).

TABLE 5

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHZ | 60, 120, 240 kHz |

In an NR system, OFDM(A) numerologies (e.g., SCS, CP length, and so on) may be differently configured between a plurality of cells integrated to one UE. Accordingly, an (absolute time) duration of a time resource (e.g., SF, slot or TTI) (for convenience, collectively referred to as a time unit (TU)) configured of the same number of symbols may be differently configured between the integrated cells.

Hereinafter, an integrated access and backhaul link (IAB) will be described. Meanwhile, hereinafter, for convenience of explanation, a proposed method will be described based on a new RAT (NR) system. However, a range of a system to which the proposed method is applied may be extended to other systems such as a 3GPP LTE/LTE-A system, or the like, in addition to the NR system.

One potential technology aimed at enabling future cellular network deployment scenarios and applications is support for wireless backhaul and relay links. This enables flexible and highly dense deployment of NR cells without the need to proportionally densify the transport network.

It is expected that greater bandwidth in NR compared to LTE with the native deployment of massive MIMO or multi-beam systems will be available. Thus (e.g., mmWave spectrum) creates opportunities for the development and deployment of integrated access and backhaul links. This makes it easier for a deployment of a dense network of self-backhauled NR cells in a more integrated manner by establishing multiple control and data channels/procedures defined to provide access or access to terminals. Such systems are referred to as integrated access and backhaul links (IAB).

The following terms may be used in the present disclosure.

AC (x): an access link between the node (x) and the UE(s).

BH (xy): a backhaul link between the node (x) and the node (y).

In this case, the node may mean a donor gNB (DgNB) or a relay node (RN). Here, the DgNB or the donor node may be a gNB that provides a function to support backhaul to IAB nodes.

In addition, in the present disclosure, for convenience of explanation, when relay node 1 and relay node 2 exist, relay node 1 which is connected to relay node 2 by a backhaul link and relaying data transmitted and received to relay node 2 is called a parent node of relay node 2, and relay node 2 is called a child node of relay node 1.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 7:
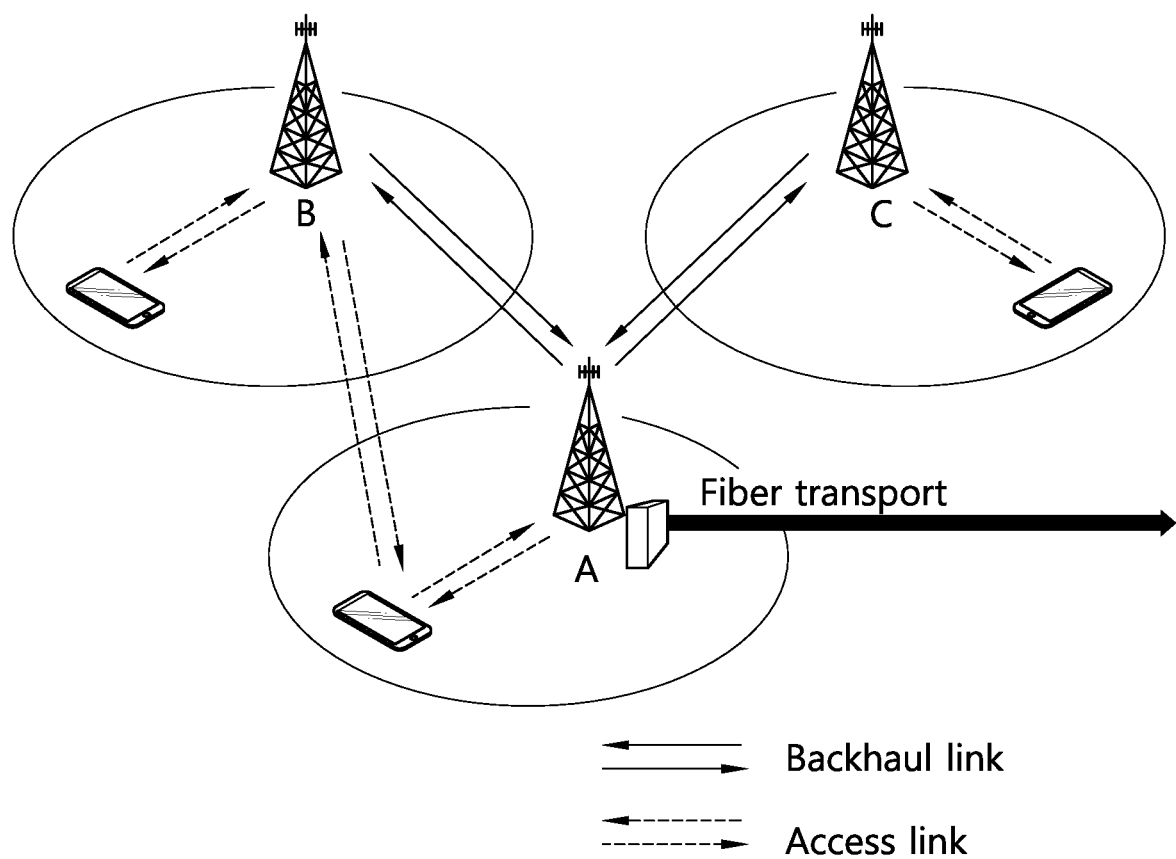
FIG. 7 schematically illustrates an example for a network with integrated access and backhaul links (IAB).

FIG. 7 schematically illustrates an example for a network with integrated access and backhaul links (IAB).

According to FIG. 7, relay nodes (rTRPs) may multiplex access and backhaul links in the time, frequency, or space domain (i.e., beam-based operation).

The operation of different links may operate on the same frequency or on different frequencies (which may also be referred to as 'in-band' or 'out-band' relays, respectively). Although efficient support of out-of-band relays is important for some NR deployment scenarios, it is very important to understand the requirements of in-band operation, which implies tight interworking with access links operating on the same frequency to accommodate duplex restrictions and avoid/mitigate interference.

Furthermore, operating an NR system in the millimeter wave spectrum have some unique challenges. It involves experiencing severe short-term blocking that cannot be easily mitigated by the current RRC-based handover mechanism due to the larger time scale required for completion of the procedure compared to short blocking. Overcoming short blocking in mmWave systems may require a fast RAN-based mechanism for switching between rTRPs that does not necessarily require the inclusion of a core network. The aforementioned need for mitigation of short blocking for NR operation in the millimeter wave spectrum, along with the need for easier deployment of self-backhauled NR cells, creates a need for the development of an integrated framework that allows for fast switching of access and backhaul links. Over-the-air (OTA) coordination between rTRPs may also be considered to mitigate interference and support end-to-end path selection and optimization.

The following requirements and aspects shall be addressed by the IAB for NR:

Efficient and flexible operation for in-band and out-of-band relaying in indoor and outdoor scenarios Multi-hop and redundant connections End-to-end path selection and optimization Support of backhaul links with high spectral efficiency Support of legacy NR UEs Legacy NR is designed to support half-duplex devices. As such, half-duplex may be supported and worthy of being targeted in an IAB scenario. Furthermore, IAB devices having a full duplex may also be considered.

Figure 8:
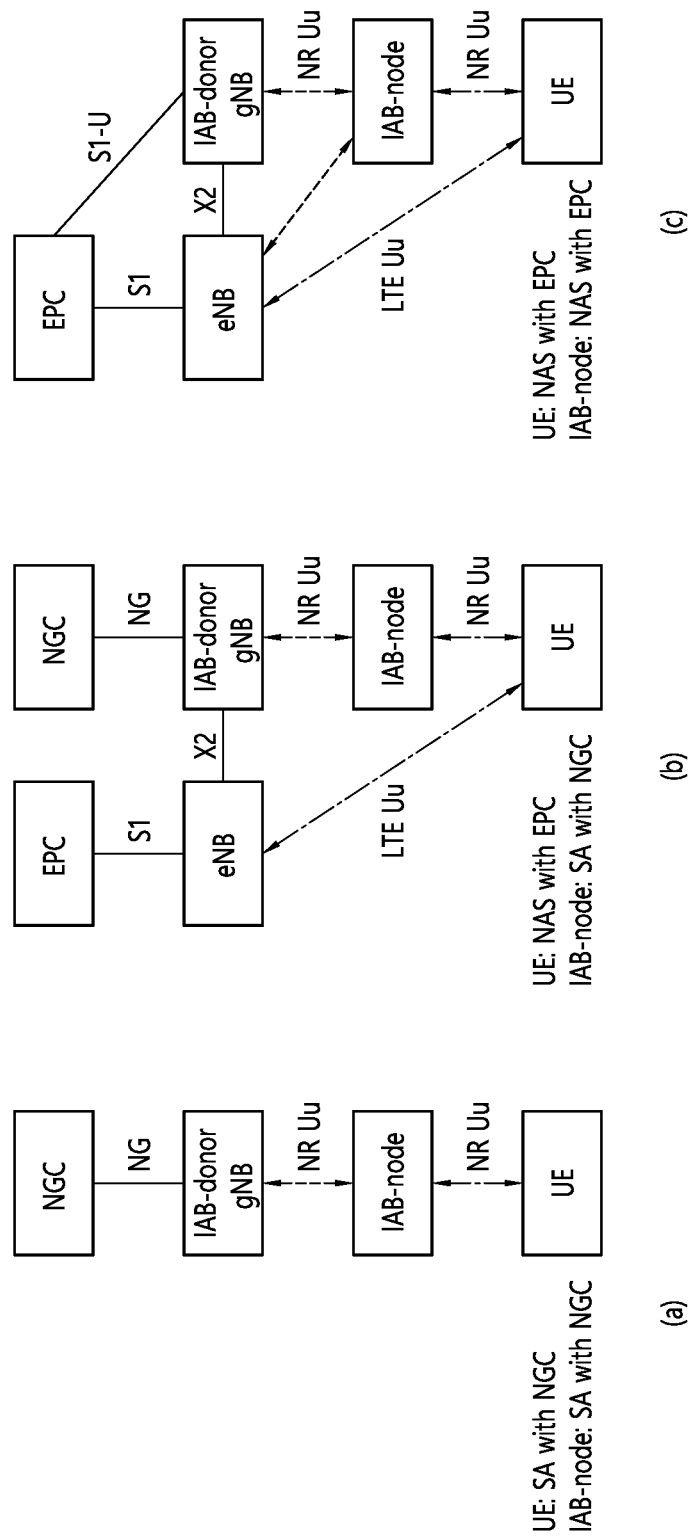
FIG. 8 shows an example of an operation of an IAB system in a standalone (SA) mode and a non-standalone (NSA) mode.

FIG. 8 shows an example of the operation of the IAB system in a standalone (SA) mode and a non-standalone (NSA) mode. Specifically, (a) of FIG. 8 shows an example of the operation of the UE and IAB node considering NGC in SA mode, (b) of FIG. 8 shows an example of the operation of the IAB node considering NGC in SA mode and the UE considering EPC in NSA mode, (c) of FIG. 8 shows an example of the operation of the UE and IAB node considering EPC in the NSA mode.

The IAB node may operate in SA mode or NSA mode. When operating in NSA mode, the IAB node uses only the NR link for backhauling. A UE connected to the IAB node may select an operation mode different from that of the IAB node. The UE may further connect to a different type of core network than the connected IAB node. In this case, (e) DECOR ((enhanced) dedicated core network) or slicing may be used for CN selection. An IAB node operating in NSA mode may be connected to the same or different eNB(s). UEs operating in the NSA mode may be connected to the same or different eNB from the IAB node to which they are connected. FIG. 8 shows an example in consideration of NGC in SA mode and an example in consideration of EPC in NSA mode.

In the IAB scenario, if each relay node (RN) does not have the scheduling capability, the donor gNB (DgNB) shall schedule the entire links between the DgNB, related relay nodes and UEs. In other words, the DgNB should make a scheduling decision for all links by collecting traffic information from all related relay nodes, and then inform each relay node of the scheduling information.

On the other hand, distributed scheduling can be performed when each relay node has a scheduling capability. Then, immediate scheduling of the uplink scheduling request of the UE is possible, and the backhaul/access link can be used more flexibly by reflecting the surrounding traffic conditions.

Figure 9:
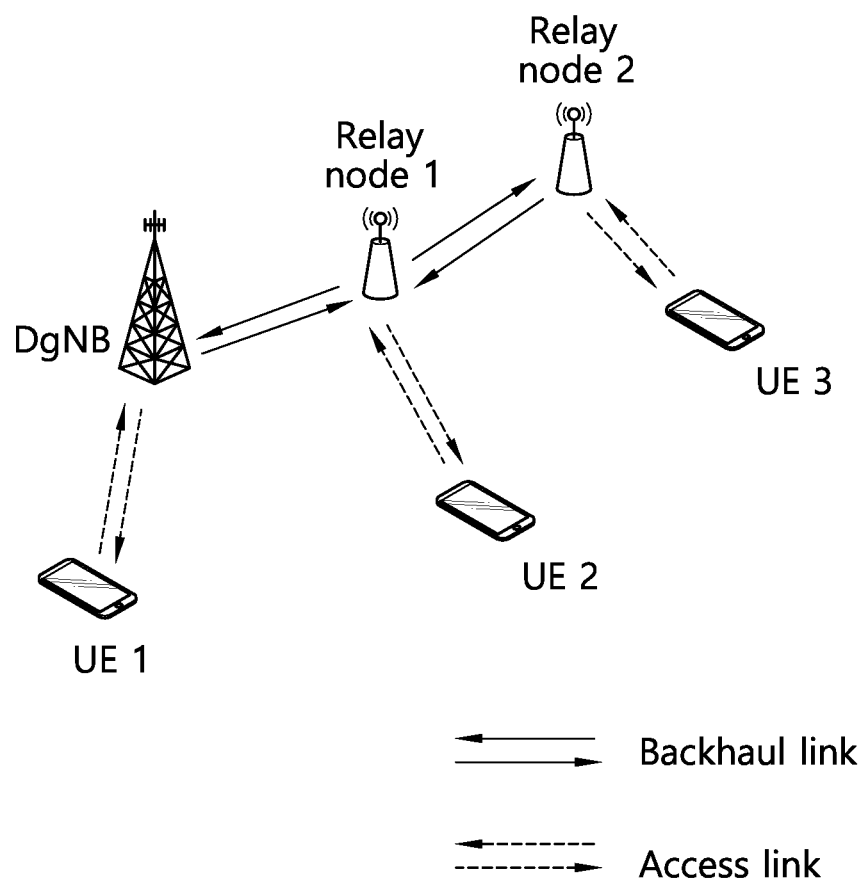
FIG. 9 schematically illustrates an example of a configuration of access and backhaul links.

FIG. 9 schematically illustrates an example of a configuration of access and backhaul links.

FIG. 9 shows an example in which a backhaul link and an access link are configured when a DgNB and an IAB relay node (RN) are present. The DgNB and RN1 connect the backhaul link, and RN2 connects the backhaul link to the RN1. The DgNB and UE1 connect the access link, the RN1 and UE2 connect the access link, and the RN2 and UE3 connect the access link.

According to FIG. 9, the DgNB not only receives a scheduling request from the UE 1, but also receives scheduling requests from the UE 2 and UE 3. Then, the DgNB makes a scheduling decision of the two backhaul links and the three access links, and informs the scheduling results. Therefore, such centralized scheduling involves scheduling delays and causes latency problems.

On the other hand, distributed scheduling can be performed if each relay node has scheduling capability. Then, immediate scheduling for the uplink scheduling request of the UE can be performed, and the backhaul/access links can be used more flexibly by reflecting the surrounding traffic situation.

Figure 10:
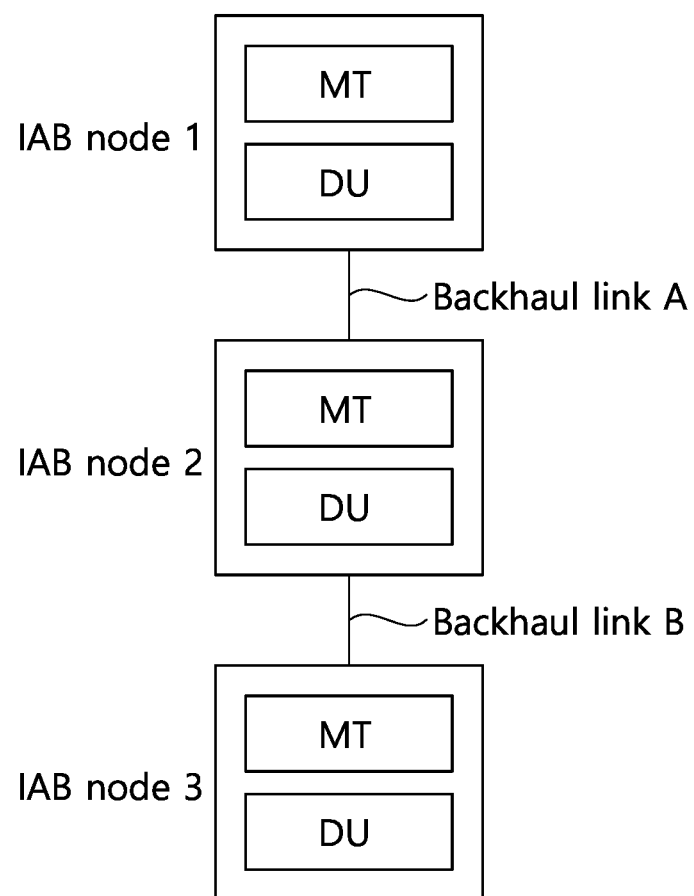
FIG. 10 explains links and relationships between IAB nodes.

FIG. 10 explains links and relationships between IAB nodes.

Referring to FIG. 10, IAB node 1 is connected to IAB node 2 through a backhaul link A. For the backhaul link A, the IAB node 1 is the parent node of the IAB node 2, and the IAB node 2 is a child node of the IAB node 1. In addition, the IAB node 2 is connected to the IAB node 3 through a backhaul link B, and the IAB node 2 is a parent node of the IAB node 3 and the IAB node 3 is a child node of the IAB node 2 for the backhaul link B.

Here, each of the IAB nodes may perform two functions. One is Mobile Termination (MT), which maintains a wireless backhaul connection to an upper IAB node or donor node. And, the other is a DU (distributed unit), which provides access connection with UEs or connection with the MT of a lower IAB node.

For example, from the point of view of the IAB node 2, the DU of IAB node 2 is functionally connected to the MT of IAB node 3 on the backhaul link B, and at the same time, the MT of IAB node 2 is functionally connected to the DU of IAB node 1 on the backhaul link A. Here, the child link of the DU of IAB node 2 may mean the backhaul link B between the IAB node 2 and IAB node 3. Also, here, the parent link of the MT of the IAB node 2 may mean the backhaul link A between the IAB node 2 and the IAB node 1.

Figure 11:
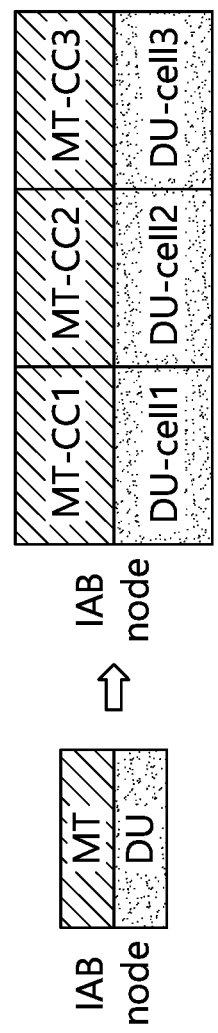
FIG. 11 illustrates an example of an IAB node including 3 MT-CCs and 3 DU-cells.

Meanwhile, a plurality of MT-component carriers (CCs) and a plurality of DU-cells may be present in the IAB node. FIG. 11 illustrates an example of an IAB node including 3 MT-CCs and 3 DU-cells.

The MT-CCs in the IAB node may operate through the same frequency resource or different frequency resources. Herein, one MT-CC may be coupled to one or a plurality of parent DU-cells. The DU-cells in the IAB node may operate through the same frequency resource or different frequency resources.

For a specific MT-CC/DU-cell pair of the IAB node, the MT-CC and the DU-cell may be in a TDM relationship or a no-TDM relationship, based on a combination of 4 transmission/reception directions as follows. Herein, whether it is TDM/no-TDM may differ for each combination of the transmission/reception directions.

($1^{st}$ combination) DU-transmission and MT-transmission ($2^{nd}$ combination) DU-reception and MT-reception ($3^{rd}$ combination) DU-transmission and MT-reception ($4^{th}$ combination) DU-reception and MT-transmission For example, for a specific MT-CC/DU-cell pair, all of the four combinations of transmission/reception directions may be used with TDM. In this case, irrespective of transmission/reception directions of a DU-cell and an MT-CC, the DU-cell and the MT-CC may operate with TDM. As another example, for the specific MT-CC/DU-cell pair, all of the four combinations of transmission/reception directions may be used with no-TDM. In this case, irrespective of transmission/reception directions of a DU-cell and an MT-CC, the DU cell and the MT-CC may always operate with no-TDM. As another example, for the specific MT-CC/DU-cell pair, the first combination and the second combination may operate with no-TDM, and the third combination and the fourth combination may operate with TDM. The aforementioned example uses a method (e.g., spatial division multiplexing (SDM), frequency division multiplexing (FDM)) in which simultaneous operations are possible when transmission/reception directions of the DU-cell and the MT-CC are identical. When the DU-cell and the MT-CC have the same transmission/reception direction, the simultaneous operations are possible. For each combination of the transmission/reception directions, TDM/no-TDM information may be configured/determined differently/independently for each specific MT-CC/DU-cell pair in an IAB node.

Hereinafter, methods proposed in the present specification will be described.

A simultaneous operation of an IAB node may be introduced in a next-generation communication system. The simultaneous operation may include both simultaneous transmission and simultaneous reception. For example, the simultaneous reception may mean that an IAB node MT and an IAB node DU simultaneously receive different signals (e.g., the MT receives a downlink signal, and the DU receives an uplink signal). The simultaneous reception may be implemented with the same RF/separate RF or the like by using an antenna of a single or multiple panels or the like. A reception signal may be processed differently according to various implementations. Herein, when each reception signal has a different power level, reception performance may deteriorate. For example, for reliable automatic gain control (AGC), the power level may be different for each reception signal to ensure linearity of an amplifier of a receiving end in order to avoid signal distortion when non-linear quantization is performed. Therefore, the present specification proposes a method of adjusting a power level of different signals received simultaneously to be less than or equal to a specific level.

A situation in which a DU and MT in an IAB node perform simultaneous reception is assumed in the description of the present specification. In addition, an environment in which an IAB node DU and an IAB node MT are in a no-TDM relationship is assumed in the description of the present specification. However, the present specification may also be applied to an environment in which the DU and the MT are in a TDM relationship. In addition, it may also be applied to a case where the DU and the MT are able to perform simultaneous reception in a relationship of SDM, FDM, or the like. As described above, a reception power level difference of the DU and MT may cause performance deterioration of a receiving end. Hereinafter, a method for preventing performance deterioration of the receiving end and a method of correcting reception power level imbalance when the imbalance occurs are proposed. For convenience, the present specification is described based on IAB nodes, i.e., an IAB node 1, an IAB node 2, and an IAB node 3, having a hierarchy as in an example of FIG. 10. In the present specification, the IAB node 1, the IAB node 2, and the IAB node 3 may respectively mean an IAB node 1 of FIG. 10, an IAB node 2 of FIG. 10, and an IAB node 3 of FIG. 10.

(Proposal 1) Method of Avoiding Reception Power Level Imbalance in Simultaneous Reception In order to avoid reception power imbalance or reception power level imbalance, a method of avoiding a case where the IAB node 1 or IAB node 3 in the example of FIG. 10 cannot adjust a transmission power level or a case where the adjustment causes an obvious disadvantage (e.g., increase in interference, or the like) may be considered. Alternatively, a method in which only a parent IAB node and child IAB node having a similar reception power level as an MT and DU in the IAB node 2 of FIG. 10 are configured to the IAB node 2 may be considered in terms of a network. Hereinafter, an operation of a DU of the IAB node 1 and a DU of the IAB node 2 is proposed to avoid reception power imbalance. In addition, an operation of an MT of the IAB node 1 and an MT of the IAB node 3 is proposed to avoid reception power imbalance.

In addition, cell state information-reference signal (CSI-RS) resource sets in which a reception power level of a UE is different may be considered. Herein, a plurality of transmission timings for a CSI-RS may be considered, and the IAB node 2 of FIG. 10 may report a CSI-RS corresponding to a target reception power level to solve the power level imbalance of simultaneous reception.

(Proposal 1.1) Operation of DU of IAB Node 1 and DU of IAB Node 2

When it is impossible to adjust the transmission power level of the DU of the IAB node 1, for resources to which an important signal/channel (e.g., a synchronization (SS)/physical broadcast channel (PBCH) block, a reference signal such as CSI-RS or the like, a cell-specific signal) is allocated, the DU of the IAB node 1 may configure such that the MT of the IAB node 3 does not perform transmission in the same resource or may restrict a transmission power level of the IAB node 3. The DU of the IAB node 1 may directly indicate the resource and/or the configuration to the IAB node 3 through F1-application protocol (AP), radio resource control (RRC), medium access control (MAC) signaling or the like. Alternatively, the DU of the IAB node 2 may indirectly indicate the resource and/or the configuration to the IAB node 3 through F1-AP, RRC, MAC signaling, or the like. On the contrary, the DU of the IAB node 1 may indicate such that the MT of the IAB node 3 performs transmission in a resource to which a signal/channel or the like capable of adjusting a transmission power level thereof is allocated. Likewise, the DU of the IAB node 1 may directly indicate the resources to the IAB node 3 through F1-AP, RRC, MAC, or the like, or the DU of the IAB node 2 may indirectly indicate the resources to the IAB node 3 through F1-AP, RRC, MAC, signaling, or the like.

For simultaneous reception, a difference of power levels of a reference signal and a reception signal corresponding thereto needs to match for two reception operations. Therefore, for a signal/channel scheduled to be received from the MT of the IAB node 3 (expected to perform simultaneous reception), the IAB node 2 may report to the DU of the IAB node 1 a difference (e.g., an energy per resource element (EPRE) ratio) of power levels of a reception signal and a reference signal received in the DU of the IAB node 2 through F1-AP or the like.

When orthogonality is ensured between a DMRS and a signal received from the IAB node 1 (a parent node of the IAB node 2) and the IAB node 3 (a child node of the IAB node 2), the IAB node 2 performing simultaneous reception may have an advantage in channel estimation and decoding of a reception signal according to the channel estimation. Therefore, the DU of the IAB node 2 may indicate a code division multiplexing (CDM) group used by the IAB node 3 in transmission to the IAB node 1 through F1-AP/RRC/MAC-CE signaling or the like. Further, the DU of the IAB node 2 may request for an indication for using the same CDM group. The aforementioned description may also be applied to a mapping type. That is, to protect channel estimation performance, a DMRS may be received in resources not overlapping, by using the mapping type differently. Therefore, to mutually ensure channel estimation performance, the IAB node 1 may not transmit the DMRS in a resource in which the IAB node 3 transmits the DMRS, and may not transmit the DMRS in a resource in which the IAB node 1 transmits the DMRS. Therefore, the DU of the IAB node 2 may indicate to the IAB node 1 a mapping type of the DMRS used by the MT of the IAB node 3 through F1-AP, RRC, MAC-CE, or the like.

In addition, signals may be received from the IAB node 1 and the IAB node 3 at the same timing. Alternatively, for the timing of the signals received from the IAB node 1 and the IAB node 3, an offset/timing offset may be present at a symbol/slot level. Therefore, the timing offset of the symbol/slot level may be reported by the DU of the IAB node 2 to the DU of the IAB node 1 through F1-AP, RRC, MAC-CE, or the like.

(Proposal 1.2) Operation of MT of IAB Node 2 and MT of IAB Node 3

When a transmission power level of the MT of the IAB node suddenly changes, there may be a problem in that performance of simultaneous reception signal of the IAB node 2 deteriorates. Therefore, in order to predict the problem, when performing a power headroom report (PHR), the IAB node-2 MT may perform a PHR report by including PHR information of the IAB node-3 MT. Alternatively, the IAB node-2 MT may perform transmission of the PHR information of the IAB node-3 MT and transmission of the PHR information of the IAB node-2 MT in a time division manner. Herein, when performing the PHR report multiple times (or when a plurality of pieces of PHR information are transmitted), in order to distinguish the PHR information of the IAB node-2 MT and the PHR information of the IAB node-3 MT, the information may be distinguished by using a 1-bit indication or the like. Alternatively, whether it is the PHR information of the IAB node-2 MT or the PHR information of the IAB node-3 MT may be distinguished by a pre-agreement.

(Proposal 2) Method of Solving Reception Power Imbalance in Simultaneous Transmission When reception performance deteriorates in signals simultaneously received by the IAB node-2 due to reception power imbalance, it may be requested to decrease transmit power of a device which has transmitted a signal having a high reception power level or it may be requested to increase transmit power of a device which has transmitted a signal having a low reception power level. The following proposal is depending on whether a reception signal transmitted from the IAB node-1 DU and a reception signal transmitted from the IAB node-3 MT has high or low receive power.

(Proposal 2.1) when a Power Level of a Signal Received by the IAB Node 2 from the IAB Node-1 DU (i.e., a DU of a Parent Node Thereof) is Higher than a Power Level of a Signal Received from the IAB Node-3 MT (i.e., an MT of a Child Node Thereof)

In case of the proposal 2.1, the IAB node 2 may request to decrease a power level of a transmission signal of the IAB node-1 DU. Alternatively, the IAB node 2 may instruct to increase the power level of the transmission signal of the IAB node-3 MT.

(Proposal 2.1.1.) Method of Requesting to Decrease Power Level of Transmission Signal of IAB Node-1 DU In the existing wireless communication system such the existing standard, or the like, it is assumed that a transmit power value of a signal transmitted for OFDM symbols configured in a bandwidth configured for measurement of CSI-RSRP (reference signal received power), CSI-RSRQ (reference signal received quality), and CSI-SINR (signal to interference plus noise ratio) is a constant. Therefore, the IAB node 2 cannot request to decrease a power level for the signals. Therefore, the IAB node 2 may request to decrease the transmit power only for a UE-specific signal except for a cell-specific signal. For example, the IAB node 2 may implicitly/explicitly request to decrease the power level for a signal except for a signal (e.g., SS/PBCH bock, CSI-RS) expected to have constant power at a receiving end or a signal (e.g., PDCCH) used by a plurality of UEs. For example, the IAB node 2 may directly request to decrease the transmission power level. Alternatively, an RARP reported by the IAB node 2 may be higher than an actual value. In addition, the IAB node 2 may expect that the power level of the reception signal to be decreased, by indirectly requesting to change a transmission beam or a reception beam.

(Proposal 2.1.2) Method of Instructing to Increase Power Level of Transmission Signal of IAB Node-3 MT When the IAB node-2 DU determines that the IAB node-3 MT is able to further use transmit power, based on a power headroom report (PHR) or the like of the IAB node-3 MT, the IAB node 2 may instruct to increase the power level of the transmission signal of the IAB node-3 MT. In this case, when the IAB node-2 MT does not increase the transmit power despite the above instruction, the IAB node 2 may request to decrease the power level of the transmission signal of the IAB node-1 DU.

Alternatively, when the IAB node-2 DU determines that the wireless device is not able to additionally use power through the PHR or the like of the IAB node-3 MT, the IAB node 2 may request to decrease the power level of the transmission signal of the IAB node-1 DU.

(Proposal 2.2) when Power Level of Signal Received by IAB Node 2 from IAB Node-1 DU is Lower than Power Level of Signal Received from IAB Node-3 MT In case of the proposal 2.2 above, the IAB node 2 may request to increase the power level of the transmission signal of the IAB node-1 DU. Alternatively, the IAB node 2 may instruct to decrease the power level of the transmission signal of the IAB node-3 MT.

(Proposal 2.2.1) Method of Requesting to Increase Power Level of Transmission Signal of IAB Node-1 DU The IAB node 2 may request to increase the transmission power level of the UE-specific signal except for the cell-specific signal of the IAB node-1 DU. The IAB node 2 may directly or indirectly request to increase the transmission power level of the UE-specific signal to the IAB node-1 DU through the following methods. Specifically, the IAB node 2 may directly request to increase the transmit power of the IAB node-1 DU. Alternatively, the IAB node 2 may report a low reception RSRP of the IAB node 2 to the IAB node 1. Alternatively, the IAB node 2 may change a reception beam thereof, and may report the change to the IAB node-1 DU. Alternatively, the IAB node 2 may change the reception beam thereof, and may not report the change to the IAB node-1 DU. Alternatively, the IAB node 2 may request to change a transmission beam of the IAB node-1 DU.

Meanwhile, the following signals or a resource for transmitting the following signals may be ensured as a DU resource for a cell-specific signal/channel.
  (1) Resource for transmission of SSB (including both CD (cell defining)-SSB and non-CD-SSB) in DU
  (2) RACH occasion configured for reception in DU
  (3) Periodic CSI-RS transmission in DU
  (4) Resource scheduled for SR reception in DU
(Proposal 2.2.2) Method Instructing to Decrease Power Level of Transmission Signal of IAB Node-3 MT Based on the method described below, the IAB node 2 may directly or indirectly request/instruct to decrease the power level of the transmission signal of the IAB node-3 MT. For example, the IAB node 2 may directly instruct to decrease the transmit power of the IAB node-3 MT. Alternatively, the IAB node 2 may report a high reception RSRP for the transmission signal of the IAB node-3 MT or may determine that reception channel quality for the IAB node 3 is good, by increasing the power level of a reference signal or the like (CSI-RS or the like) for determining the transmit power of the IAB node 3. Alternatively, the IAB node 2 may change a beam for receiving a signal of the IAB node 3 or may instruct to change the transmission beam of the IAB node 3. Accordingly, it may be considered that a reception power level is decreased.

(Proposal 3) Method of Solving Self-Interference (SI) in MT-Reception and DU-Reception In addition to simultaneous reception, simultaneous transmission and reception of an IAB node may be introduced in a next-generation communication system. The simultaneous transmission and reception may include a (MT-transmission, DU-reception) pair and a (MT-reception, DU-transmission) pair. When performing simultaneous transmission and reception, an SI problem may occur. A difference between (MT-transmission, DU-reception) and (MT-reception, DU-transmission) is an SI reception (or damage) subject or a power control requiring target. In case of (MT-reception, DU-transmission), reception performance deterioration caused by the SI may occur in the IAB node MT. Therefore, the IAB node MT may measure the SI, and may control transmit power of the IAB node DU, based on the measurement. Since a transmission direction of the IAB node DU is downlink, transmit power of a child node thereof may be randomly adjusted according to implementations in terms of the IAB node (or BS). On the other hand, in case of (MT-transmission, DU-reception), reception performance deterioration caused by the SI may occur in the IAB node DU. Therefore, power control of the IAB node MT may be required. However, since the IAB node MT shall perform transmission with transmit power indicated by a DU of a parent IAB node, the reception performance deterioration problem may not be solved based on implementations or the like. Hereinafter, a method for solving the reception performance deterioration problem is proposed.

For example, in a situation of MT-transmission and DU-reception, an SI received by the IAB node DU may be measured in the same manner as a method of measuring sounding reference signal (SRS)-RSRP or same link interference (SLI)-received signal strength indicator (RSSI) at cross link interference (CLI). In addition, since the IAB node is a single node, information may be smoothly exchanged between the MT and the DU. Therefore, the IAB node MT may measure the SI measured in the same or similar manner as a method of measuring SRS-RSRP or SLI-RSSI of CLI by the IAB node DU. Methods proposed hereinafter may be used when the IAB node MT is able to know the SI measured by the IAB node DU.

(Method 1) Power Control by DU of Parent IAB Node

The IAB node MT may periodically report the SI to the DU of the parent IAB node through RRC, MAC-CE, UCI, or the like. The DU of the parent IAB node may monitor the report. In addition, the parent IAB node DU may adjust uplink power of the IAB node MT, based on the monitoring. Periodicity, slot offset, or the like for the SI report of the IAB node MT may be configured and changed through RRC, MAC-CE, DCI, or the like. In addition, the SI report of the IAB node MT may be performed simultaneously or separately (i.e., independently) with the CSI-RS report. That is, the SI report of the IAB node MT may be performed together with a periodic CSI-RS report and a semi-persistent CSI-RS report.

Alternatively, the IAB node MT may persistently monitor the SI. In this case, the IAB node MT may report the SU to a parent IAB node DU only when a specific condition is satisfied. For example, when the SI is out of a pre-agreed specific value range, the IAB node MT may report the SI to the parent IAB node DU. Alternatively, when an absolute value of a change between an SI measured at an immediate previous time and an SI measured at a current time is greater than or equal to a specific value or when a ratio between the SI measured at the immediate previous time and the SI measured at the current time exceeds a specific value, the IAB node MT may report the SI, the absolute value of the change, and/or the ratio or the like to the parent IAB node DU. The parent IAB node DU which has received the SI report may adjust uplink power of the IAB node MT. Herein, after the parent IAB node pre-sets a slot offset and/or period to a UE/IAB node MT, the IAB node MT may report the SI or aperiodically report the SI only in a determined resource, based on the slot offset and/or period. Alternatively, the IAB node MT may report the SI by using a slot offset of the aperiodic CSI-RS.

(Method 2) Power Control Based on Assistant Information of IAB Node MT

Unlike in the method 1, when an SI measured by an IAB node DU of the IAB node MT is out of a predetermined specific value/range, for example, when the measured SI exceeds a predetermined absolute value, if a difference of an amount of change between an SI measured immediately previous time and an SI measured at a current time or a ratio between the SI measured at the immediately previous time and the SI measured at the current time exceeds a specific value, the IAB node MT may not report the SI to a parent IAB node DU, and may transmit assistant information requesting for uplink power control of the IAB node MT. Herein, the assistant information may report target transmit power calculated by the IAB node, based on the measured SI. Alternatively, the assistant information may report a difference between target transmit power and current transmit power. Alternatively, the assistant information may be a bit or information for requesting to decrease transmit power of the IAB node MT.

Meanwhile, an IAB node MT is functionally equivalent to a terminal/UE. Therefore, it may be considered that an entity to which the aforementioned method is applied is changed to the UE. That is, the IAB node MT of the aforementioned method may be replaced with the UE, and the IAB node DU may be replaced with a BS such as a gNB or the like. In particular, the aforementioned method may be applied to a UE performing full-duplex or full-duplex-based operation. Herein, the UE performing the full-duplex may be a UE performing transmission and reception at the same time. Herein, a transmission frequency band at which the full-duplex is performed may overlap in part or entirely with a reception frequency band at which the full-duplex is performed. Alternatively, even if the transmission frequency band at which the full-duplex is performed does not overlap with the reception frequency band at which the full-duplex is performed, the transmission frequency band may be adjacent to the reception frequency band.

Specifically, when an SI measured by the UE performing full-duplex is out of a pre-agreed specific value/range, for example, when the measured SI exceeds a pre-agreed absolute value or when a difference of an amount of change between an SI measured immediately previous time and an SI measured at a current time or a ratio between the SI measured at the immediately previous time and the SI measured at the current time exceeds a specific value, the UE may not directly report the SI to a BS, and may transmit assistant information requesting for uplink power control of the IAB node MT. Herein, the assistant information may report target transmit power calculated by the UE, based on the measured SI. Alternatively, the assistant information may report a difference between target transmit power and current transmit power. Alternatively, the assistant information may be a bit or information for requesting to increase or decrease transmit power of the UE. The assistant information may be transmitted through RRC, MAC-CE, DCI, or the like.

The aforementioned method may be applied to a UE which is not the UE performing full-duplex. In particular, the aforementioned method may be applied to a BS performing full-duplex. The BS performing full-duplex may be a BS performing transmission and reception at the same time. Herein, a transmission frequency band at which the full-duplex is performed may overlap in part or entirely with a reception frequency band at which the full-duplex is performed. Alternatively, even if the transmission frequency band at which the full-duplex is performed does not overlap with the reception frequency band at which the full-duplex is performed, the transmission frequency band may be adjacent to the reception frequency band. For example, methods proposed through the present specification may be applied to a BS which uses a sub-band full duplex (SBFD)-based resource configuration and a single frequency full duplex (SFFD)-based resource configuration. The SBFD-based resource configuration and the SFFD-based resource configuration will be described with reference to FIG. 12 to FIG. 15.

Figure 12:
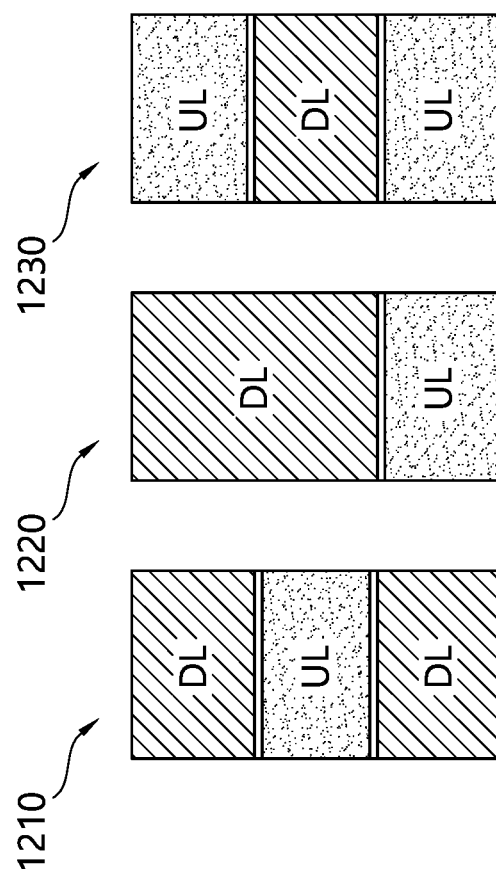
FIG. 12 illustrates a time-domain resource having an SBFD-based resource configuration.

FIG. 12 illustrates a time-domain resource having an SBFD-based resource configuration.

Specifically, an SBFD-based resource configuration in units of slots or symbols are illustrated in 1210, 1220, and 1230 of FIG. 12. In addition, a downlink sub-band frequency resource region is denoted by DL, and an uplink sub-band frequency resource region is denoted by UL.

Referring to FIG. 12, the downlink sub-band frequency resource region and the uplink sub-band frequency resource region may not overlap with each other. In addition, a guard band may be present between the downlink sub-band frequency resource region and the uplink sub-band frequency resource region.

Figure 13:
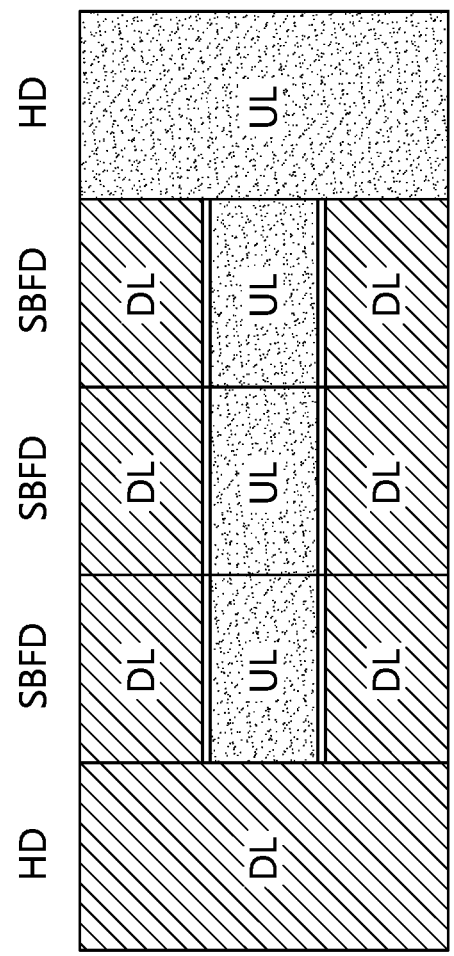
FIG. 13 illustrates a frequency-domain resource having an SBFD-based resource configuration.

FIG. 13 illustrates a frequency-domain resource having an SBFD-based resource configuration.

Referring to FIG. 13, a slot or symbol in which half-duplex-based transmission and reception can be performed is denoted by HD, and a slot or symbol in which SBFD-based transmission and reception can be performed is denoted by SBFD. In addition, a frequency resource region in which a downlink operation can be performed in each slot or symbol is denoted by DL, and a frequency resource region in which an uplink operation can be performed in each slot or symbol is denoted by UL.

Figure 14:
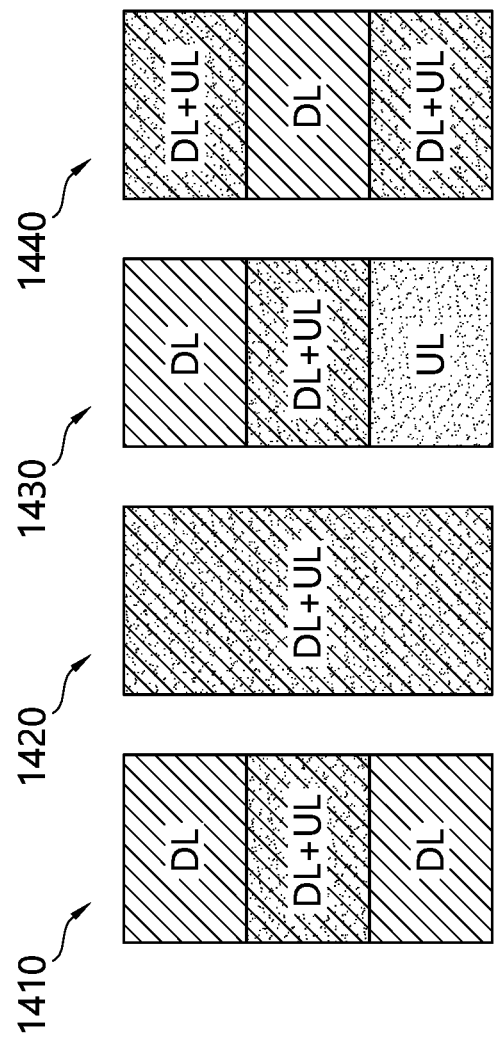
FIG. 14 illustrates a time-domain resource having an SFFD-based resource configuration.

FIG. 14 illustrates a time-domain resource having an SFFD-based resource configuration.

Specifically, an SFFD-based resource configuration in units of slots or symbols are illustrated in 1410, 1420, 1430, and 1440 of FIG. 14. In addition, a downlink sub-band frequency resource region is denoted by DL, and an uplink sub-band frequency resource region is denoted by UL.

Referring to FIG. 14, the downlink sub-band frequency resource region and the uplink sub-band frequency resource region may overlap with each other. Herein, a region in which the downlink sub-band frequency resource region and the uplink sub-band frequency resource region overlaps is denoted by DL+UL.

Figure 15:
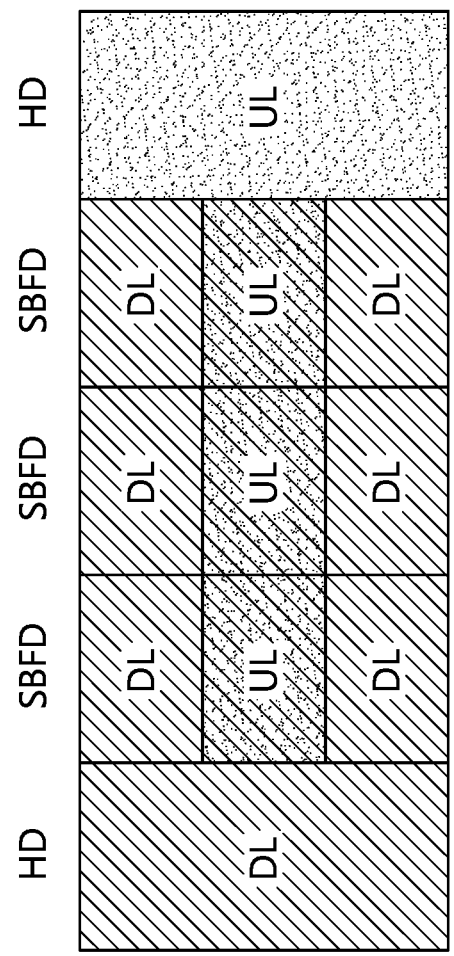
FIG. 15 illustrates a frequency-domain resource having an SFFD-based resource configuration.

FIG. 15 illustrates a frequency-domain resource having an SFFD-based resource configuration.

Referring to FIG. 15, a slot or symbol on which half-duplex-based transmission and reception can be performed is denoted by HD, and a slot or symbol on which SFFD-based transmission and reception can be performed is denoted by SFFD. In addition, a frequency resource region in which a downlink operation can be performed in each slot or symbol is denoted by DL, and a frequency resource region in which an uplink operation can be performed in each slot or symbol is denoted by UL.

Referring to FIG. 15, the slot or symbol on which half-duplex-based transmission and reception can be performed and the slot or symbol on which SFFD-based transmission and reception can be performed may be subjected to TDM.

For example, in a time resource in which a BS performs full-duplex-based transmission and reception operations, the aforementioned method may be applied when a UE requests for uplink power control. In a time duration in which the BS performs full-duplex, a UE performing downlink reception and a UE performing uplink reception may exist together. In this case, the UE performing uplink transmission may cause an increase in an interference level of the UE performing downlink reception. Therefore, there may be a problem in that reception sensitivity deteriorates in the UE performing downlink reception. Accordingly, the UE performing downlink reception may report related information to the BS.

In this case, the UE performing downlink reception is not able to decode a signal transmitted from the UE performing uplink transmission. Therefore, although there is no change in reference signal received power (RSRP) of the UE performing downlink reception, a noise floor may increase due to interference. Accordingly, the UE performing downlink reception may request for uplink power control according to a reception noise floor for a time duration in which the BS performs full-duplex.

The request/instruction of the uplink power control may be performed based on CSI-RS resource sets having different reception power levels of the UE described through the proposal 1. For example, a plurality of transmitting timings may be present for the CSI-RS resource sets having different power levels. Herein, the UE may perform a report for a CSI-RS corresponding to a target reception power level in order to solve reception sensitivity deterioration caused by interference such as an increase in a noise floor or the like.

Alternatively, according to the aforementioned method, the UE may request to increase the transmission power level of the UE-specific signal except for the cell-specific signal of the BS. For example, when the UE determines that reception sensitivity deteriorates due to interference or when a noise floor of the UE is increased by at least a specific threshold according to a pre-agreement, the UE may request to increase the transmission power level of the BS through RRC, MAC-CE, DCI, or the like. Alternatively, the UE may report a low reception RSRP. For example, an increasing amount of the noise floor may be excluded from an RSRP measured by the UE. Alternatively, when the UE reports an RSRP of a specific value according to a predetermination, the BS may determine that the report is a transmit power increase request for the BS due to sensitivity deterioration caused by an increase in interference or the like of the UE. Alternatively, the UE may change a reception beam thereof, and may report the change to the BS. Alternatively, the UE may change the reception beam, and may not report the change to the BS. Alternatively, the UE may request to change a transmission beam of the BS. Herein, for example, the UE may not perform the transmit power increase request for a specific resource, for example, a resource for SSB transmission, a resource scheduled for configured RACH occasion, periodic CSI-RS transmission, SR reception, or the like.

Figure 16:
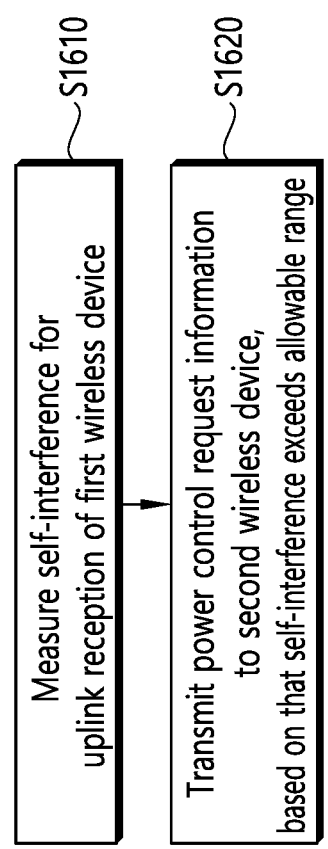
FIG. 16 is a flowchart for an example of a method of performing power control of a first wireless device according to some implementations of the present specification.

Method proposed in the present specification may be implemented through various embodiments. FIG. 16 is a flowchart for an example of a method of performing power control of a first wireless device according to some implementations of the present specification.

Referring to FIG. 16, the first wireless device measures self-interference for uplink reception of the first wireless device (S1610). Herein, the self-interference may be measured based on at least one of reference signal received power (RSRP), reference signal received quality (RSRQ), and received signal strength indicator (RSSI).

The first wireless device transmits power control request information to a second wireless device, based on that the self-interference exceeds an allowable range (S1620). Herein, the power control request information may include power control information for uplink transmission of the first wireless device.

In the example of FIG. 16, the first wireless device may be a UE, and the second wireless device may be a BS. Alternatively, the first wireless device may be an IAB node, and the second wireless device may be a parent IAB node of the first wireless device. Herein, when the first wireless device is the IAB node, the uplink reception may mean an operation in which an MT of the IAB node receives a signal from a DU of the parent IAB node, and the uplink transmission may mean an operation in which the MT of the IAB node transmits a signal to the DU of the parent IAB node.

Figure 17:
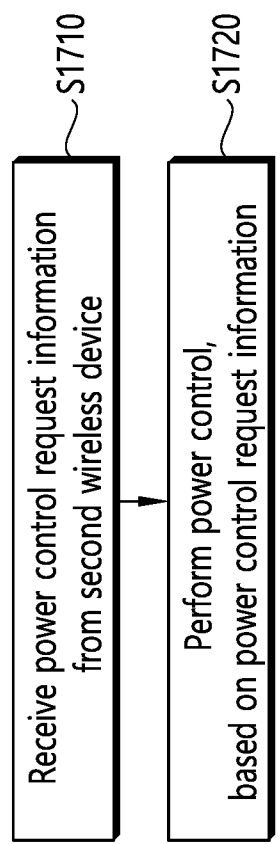
FIG. 17 is a flowchart for another example of a method of performing power control of a first wireless device according to some implementations of the present specification.

Method proposed in the present specification may be implemented through various embodiments. FIG. 17 is a flowchart for another example of a method of performing power control of a first wireless device according to some implementations of the present specification.

Referring to FIG. 17, the first wireless device receives power control request information from a second wireless device (S1710). Herein, the power control request information may include transmit power information of transmission performed for the first wireless device by the second wireless device.

The first wireless device performs power control, based on the power control request information (S1720). Herein, the power control may include a first configuration of first transmit power used in downlink transmission of the first wireless device, and the first transmit power may decrease based on the first configuration.

Herein, the power control may include a second configuration of second transmit power used in uplink transmission of the second wireless device, and the second transmit power may increase based on the second configuration. Herein, the first wireless device may transmit information reporting the second configuration to the second transmission device.

In the example of FIG. 17, the first wireless device may be a BS, and the second wireless device may be a UE. Alternatively, the first wireless device may be an IAB node, and the second wireless device may be a child IAB node of the first wireless device.

Meanwhile, the example of FIG. 16 and the example of FIG. 17 may be performed independently. Alternatively, the example of FIG. 16 and the example of FIG. 17 may be performed in parallel or at the same time.

Methods proposed in the present specification may include at least one computer readable medium, which is executed by at least one processor, one or more processors, and one or more memories operatively coupled by means of the one or more processors and storing instructions, in addition to a UE, a BS, and an IAB node. The one or more processors may also be performed by an apparatus configured to control the UE, the BS, and the IAB node and performing methods proposed in the present specification by executing the instructions. In addition, according to the methods proposed in the present specification, it is apparent that an operation to be performed by another UE, another BS, and another IAB node, corresponding to an operation performed by the UE, the BS, and the IAB node, may be considered.

Hereinafter, an example of a communication system to which the present disclosure is applied will be described.

Although not limited to this, various descriptions, functions, procedures, proposals, methods, and/or operation flowcharts of the present disclosure disclosed in this document may be applied to various fields requiring wireless communication/connection (e.g., 5G) between devices.

Hereinafter, it will be exemplified in more detail with reference to the drawings. In the following drawings/descriptions, the same reference numerals may represent the same or corresponding hardware blocks, software blocks, or functional blocks, unless otherwise indicated.

Figure 18:
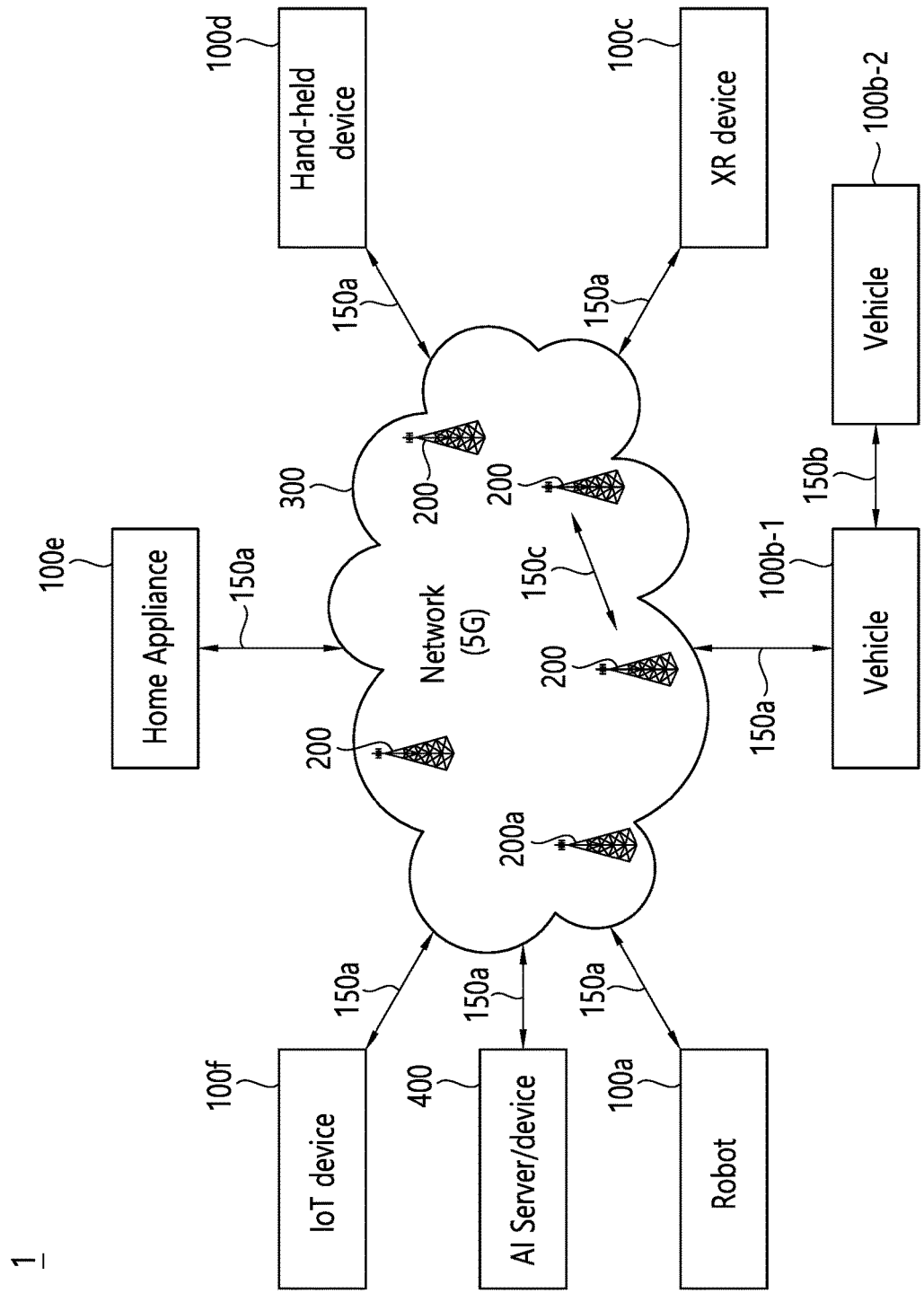
FIG. 18 shows a communication system (1), in accordance with an embodiment of the present disclosure.

FIG. 18 shows a communication system (1), in accordance with an embodiment of the present disclosure.

Referring to FIG. 18, a communication system (1) to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100*a*), vehicles (100*b*-1, 100*b*-2), an eXtended Reality (XR) device (100*c*), a hand-held device (100*d*), a home appliance (100*e*), an Internet of Things (IoT) device (100*f*), and an Artificial Intelligence (AI) device/server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

Here, the wireless communication technology implemented in the wireless device of the present specification may include a narrowband Internet of Things for low-power communication as well as LTE, NR, and 6G. In this case, for example, the NB-IoT technology may be an example of a Low Power Wide Area Network (LPWAN) technology. In addition, it may be implemented in standards such as LTE Cat NB1 and/or LTE Cat NB2, and is not limited to the above-described name. Additionally or alternatively, the wireless communication technology implemented in the wireless device of the present specification may perform communication based on LTE-M technology. In this case, as an example, the LTE-M technology may be an example of an LPWAN technology, and may be called by various names such as enhanced machine type communication (eMTC). For example, LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described name. Additionally or alternatively, the wireless communication technology implemented in the wireless device of the present specification may include at least one of ZigBee, Bluetooth, and Low Power Wide Area Network (LPWAN) in consideration of low-power communication, and is not limited to the above-described name. For example, the ZigBee technology can create PAN (personal area networks) related to small/low-power digital communication based on various standards such as IEEE 802.15.4, and can be called by various names.

The wireless devices (100a-100f) may be connected to the network (300) via the BSs (200). An AI technology may be applied to the wireless devices (100a-100f) and the wireless devices (100a-100f) may be connected to the AI server (400) via the network (300). The network (300) may be configured using a 3G network, a 4G (e.g., LTE) network, or a 5G (e.g., NR) network. Although the wireless devices (100a-100f) may communicate with each other through the BSs (200)/network (300), the wireless devices (100a-100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a-100f).

Wireless communication/connections (150a, 150b, 150c) may be established between the wireless devices (100a~100f)/BS (200), or BS (200)/BS (200). Herein, the wireless communication/connections may be established through various RATs (e.g., 5G NR) such as uplink/downlink communication (150a), sidelink communication (150b) (or, D2D communication), or inter BS communication (e.g. relay, Integrated Access Backhaul (IAB)). The wireless devices and the BSs/the wireless devices may transmit/receive radio signals to/from each other through the wireless communication/connections (150a, 150b). For example, the wireless communication/connections (150a, 150b) may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 19:
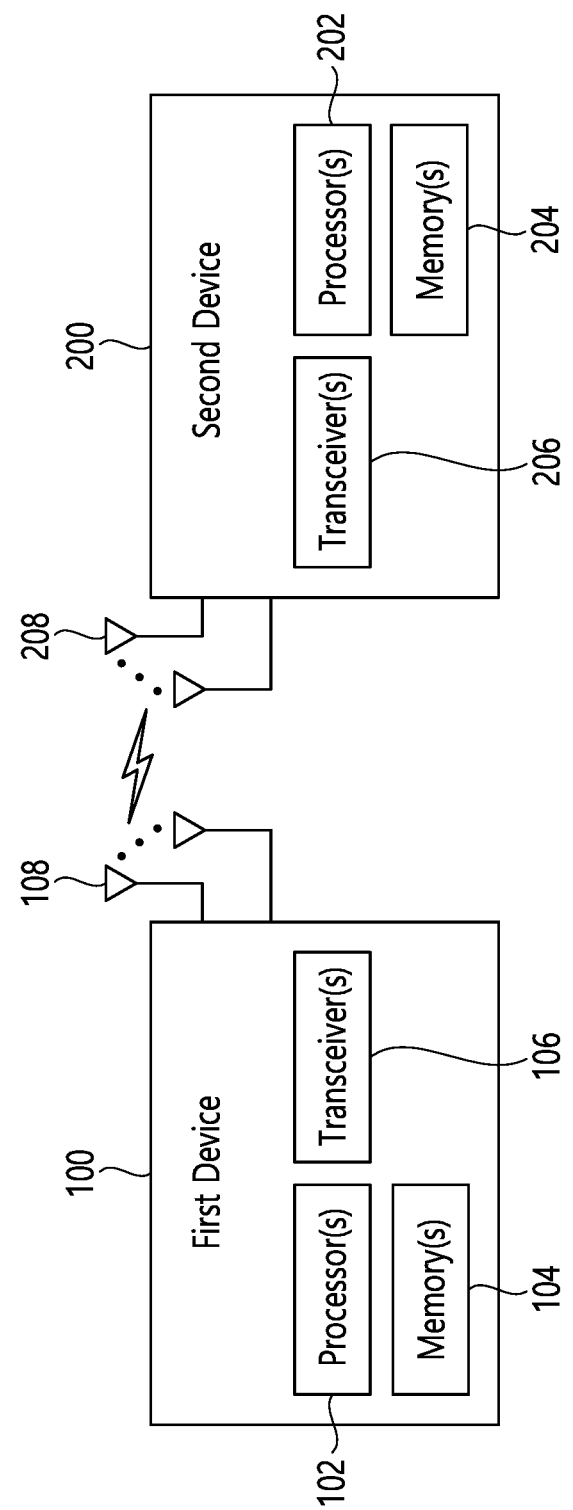
FIG. 19 shows wireless devices, in accordance with an embodiment of the present disclosure.

FIG. 19 shows wireless devices, in accordance with an embodiment of the present disclosure.

Referring to FIG. 19, a first wireless device (100) and a second wireless device (200) may transmit radio signals through a variety of RATs (e.g., LTE and NR). Herein, {the first wireless device (100) and the second wireless device (200)} may correspond to {the wireless device (100x), the BS (200)} and/or {the wireless device (100x), the wireless device (100x)} of FIG. 18.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store a variety of information related to operations of the processor(s) (102). For example, the memory(s) (104) may store software code including commands for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present disclosure, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (106) and then store information obtained by processing the fourth information/signals in the memory(s) (204). The memory(s) (204) may be connected to the processor(s) (202) and may store a variety of information related to operations of the processor(s) (202). For example, the memory(s) (204) may store software code including commands for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF unit(s). In the present disclosure, the wireless device may represent a communication modem/circuit/chip.

Hereinafter, hardware elements of the wireless devices (100, 200) will be described more specifically. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, commands, and/or a set of commands.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, and so on, from RF band signals into baseband signals in order to process received user data, control information, radio signals/channels, and so on, using the one or more processors (102, 202). The one or more transceivers (106, 206) may convert the user data, control information, radio signals/channels, and so on, processed using the one or more processors (102, 202) from the base band signals into the RF band signals. To this end, the one or more transceivers (106, 206) may include (analog) oscillators and/or filters.

Figure 20:
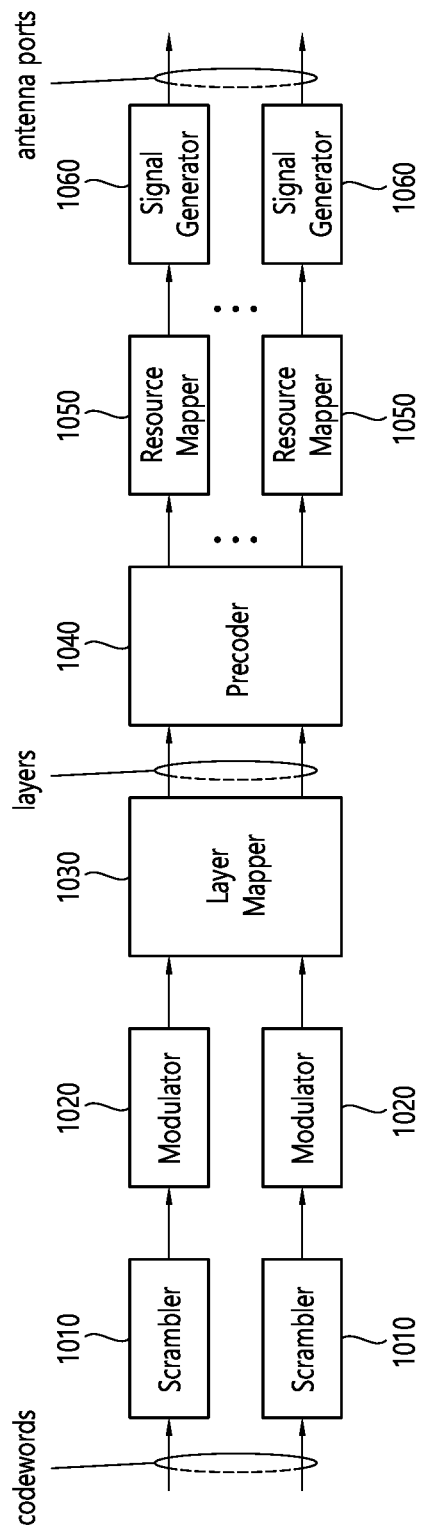
FIG. 20 shows a signal process circuit for a transmission signal, in accordance with an embodiment of the present disclosure.

FIG. 20 shows a signal process circuit for a transmission signal, in accordance with an embodiment of the present disclosure.

Referring to FIG. 20, a signal processing circuit (1000) may include scramblers (1010), modulators (1020), a layer mapper (1030), a precoder (1040), resource mappers (1050), and signal generators (1060). An operation/function of FIG. 20 may be performed, without being limited to, the processors (102, 202) and/or the transceivers (106, 206) of FIG. 19. Hardware elements of FIG. 20 may be implemented by the processors (102, 202) and/or the transceivers (106, 206) of FIG. 19. For example, blocks 1010~1060 may be implemented by the processors (102, 202) of FIG. 19. Alternatively, the blocks 1010~1050 may be implemented by the processors (102, 202) of FIG. 19 and the block 1060 may be implemented by the transceivers (106, 206) of FIG. 19.

Codewords may be converted into radio signals via the signal processing circuit (1000) of FIG. 20. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports and M is the number of transport layers. The precoder (1040) may perform precoding after performing transform precoding (e.g., DFT) for complex modulation symbols. Alternatively, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures (1010~1060) of FIG. 20. For example, the wireless devices (e.g., 100, 200 of FIG. 19) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 21:
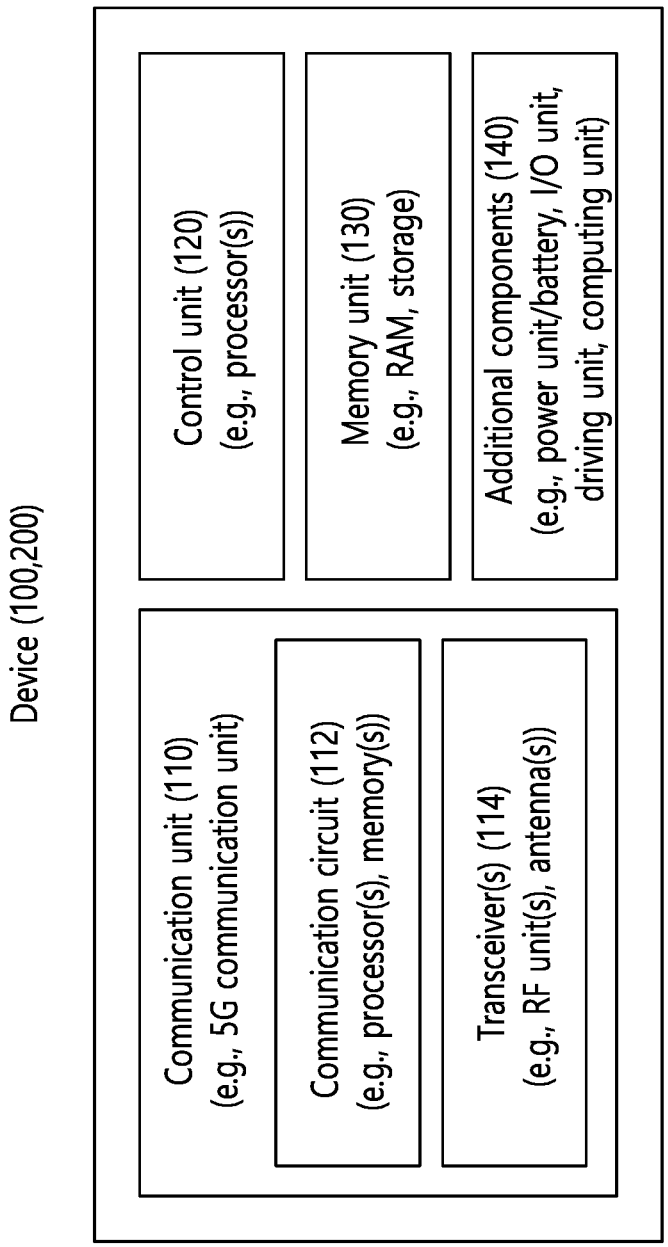
FIG. 21 shows another example of a wireless device, in accordance with an embodiment of the present disclosure.

FIG. 21 shows another example of a wireless device, in accordance with an embodiment of the present disclosure. The wireless device may be implemented in various forms according to a use-case/service (refer to FIG. 18).

Referring to FIG. 21, wireless devices (100, 200) may correspond to the wireless devices (100, 200) of FIG. 19 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 19. For example, the transceiver(s) (114) may include the one or more transceivers (106, 206) and/or the one or more antennas (108, 208) of FIG. 19. The control unit (120) is electrically connected to the communication unit (110), the memory (130), and the additional components (140) and controls overall operation of the wireless devices. For example, the control unit (120) may control an electric/mechanical operation of the wireless device based on programs/code/commands/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 18), the vehicles (100b-1, 100b-2 of FIG. 18), the XR device (100c of FIG. 18), the hand-held device (100d of FIG. 18), the home appliance (100e of FIG. 18), the IoT device (100f of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, and so on. The wireless device may be used in a mobile or fixed place according to a use-example/service.

In FIG. 21, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 21 will be described in detail with reference to the drawings.

Figure 22:
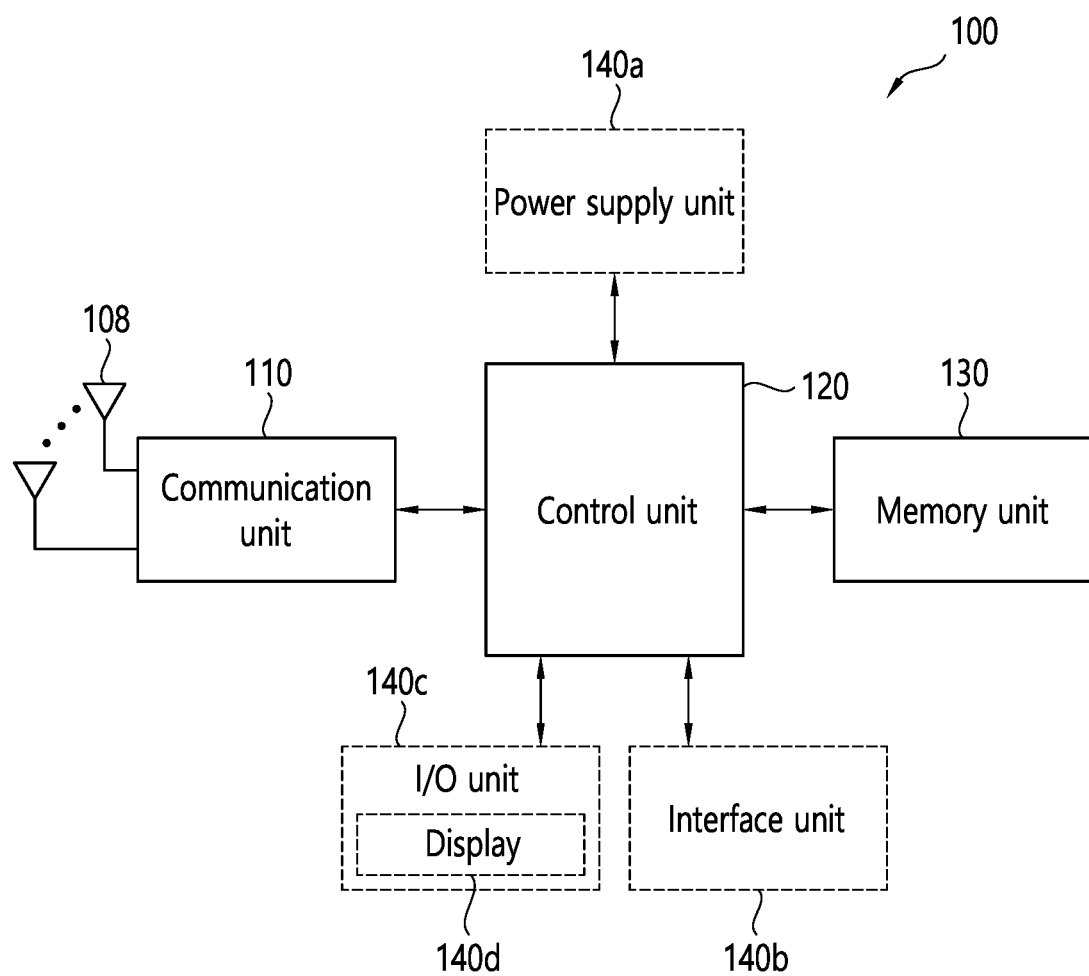
FIG. 22 shows a hand-held device, in accordance with an embodiment of the present disclosure.

FIG. 22 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 22, a hand-held device (100) may include an antenna unit (108), a communication unit (110), a control unit (120), a memory unit (130), a power supply unit (140a), an interface unit (140b), and an I/O unit (140c). The antenna unit (108) may be configured as a part of the communication unit (110). Blocks 110~130/140a~140c correspond to the blocks 110~130/140 of FIG. 21, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/commands needed to drive the hand-held device (100). The memory unit (130) may store input/output data/information. The power supply unit (140a) may supply power to the hand-held device (100) and include a wired/wireless charging circuit, a battery, and so on. The interface unit (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

Figure 23:
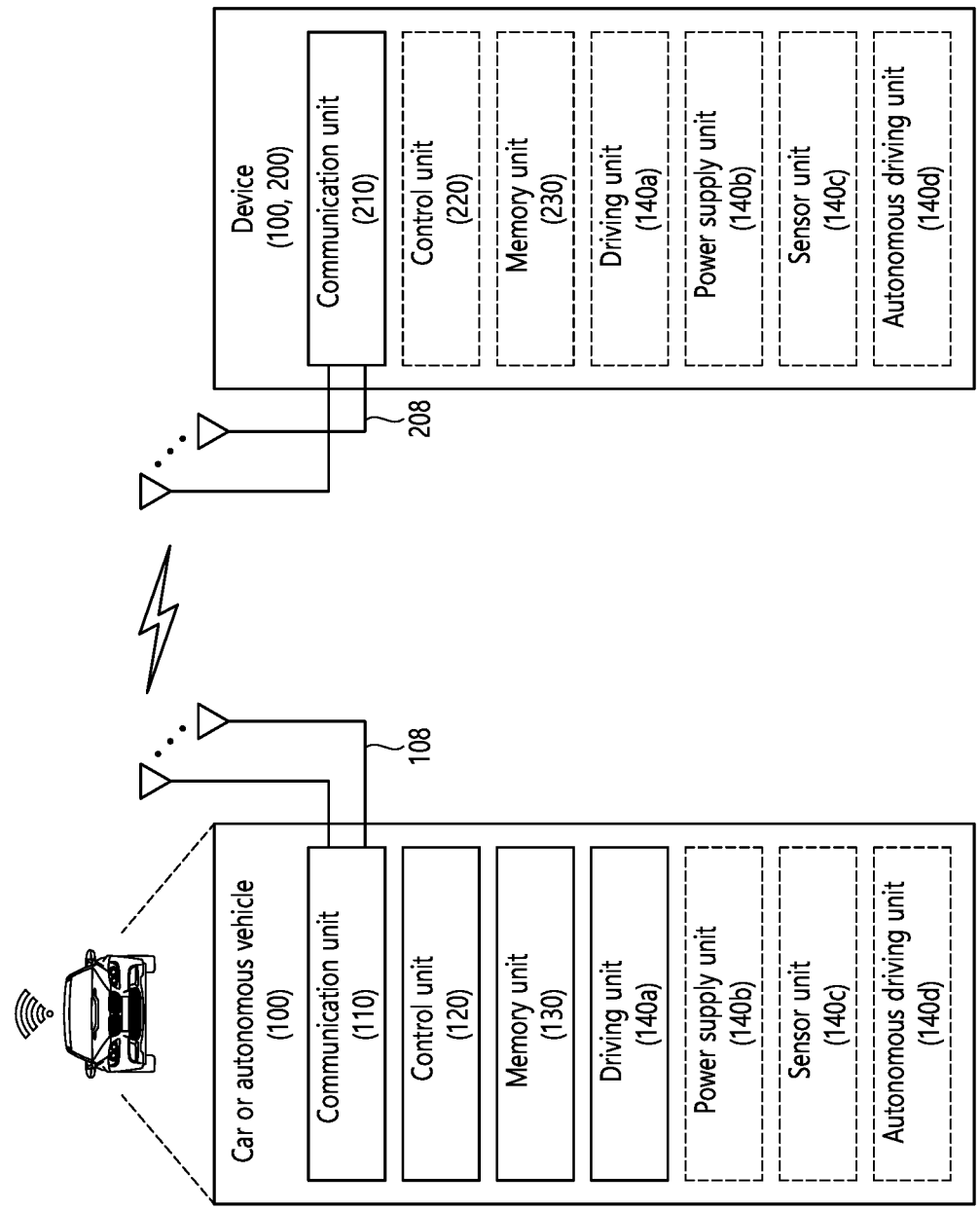
FIG. 23 shows a vehicle or an autonomous vehicle, in accordance with an embodiment of the present disclosure.

FIG. 23 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, and so on.

Referring to FIG. 23, a vehicle or autonomous vehicle (100) may include an antenna unit (108), a communication unit (110), a control unit (120), a driving unit (140a), a power supply unit (140b), a sensor unit (140c), and an autonomous driving unit (140d). The antenna unit (108) may be configured as a part of the communication unit (110). The blocks 110/130/140a~140d correspond to the blocks 110/130/140 of FIG. 21, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous vehicle (100). The control unit (120) may include an Electronic Control Unit (ECU). The driving unit (140a) may cause the vehicle or the autonomous vehicle (100) to drive on a road. The driving unit (140a) may include an engine, a motor, a powertrain, a wheel, a brake, a steering device, and so on. The power supply unit (140b) may supply power to the vehicle or the autonomous vehicle (100) and include a wired/wireless charging circuit, a battery, and so on. The sensor unit (140c) may obtain a vehicle state, ambient environment information, user information, and so on. The sensor unit (140c) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit (140d) may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit (110) may receive map data, traffic information data, and so on, from an external server. The autonomous driving unit (140d) may generate an autonomous driving path and a driving plan from the obtained data. The control unit (120) may control the driving unit (140a) such that the vehicle or the autonomous vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140c) may obtain a vehicle state and/or surrounding environment information. The autonomous driving unit (140d) may update the autonomous driving path and the driving plan based on the newly obtained data/information. The communication unit (110) may transfer information on a vehicle position, the autonomous driving path, and/or the driving plan to the external server. The external server may predict traffic information data using AI technology, and so on, based on the information collected from vehicles or autonomous vehicles and provide the predicted traffic information data to the vehicles or the autonomous vehicles.

Figure 24:
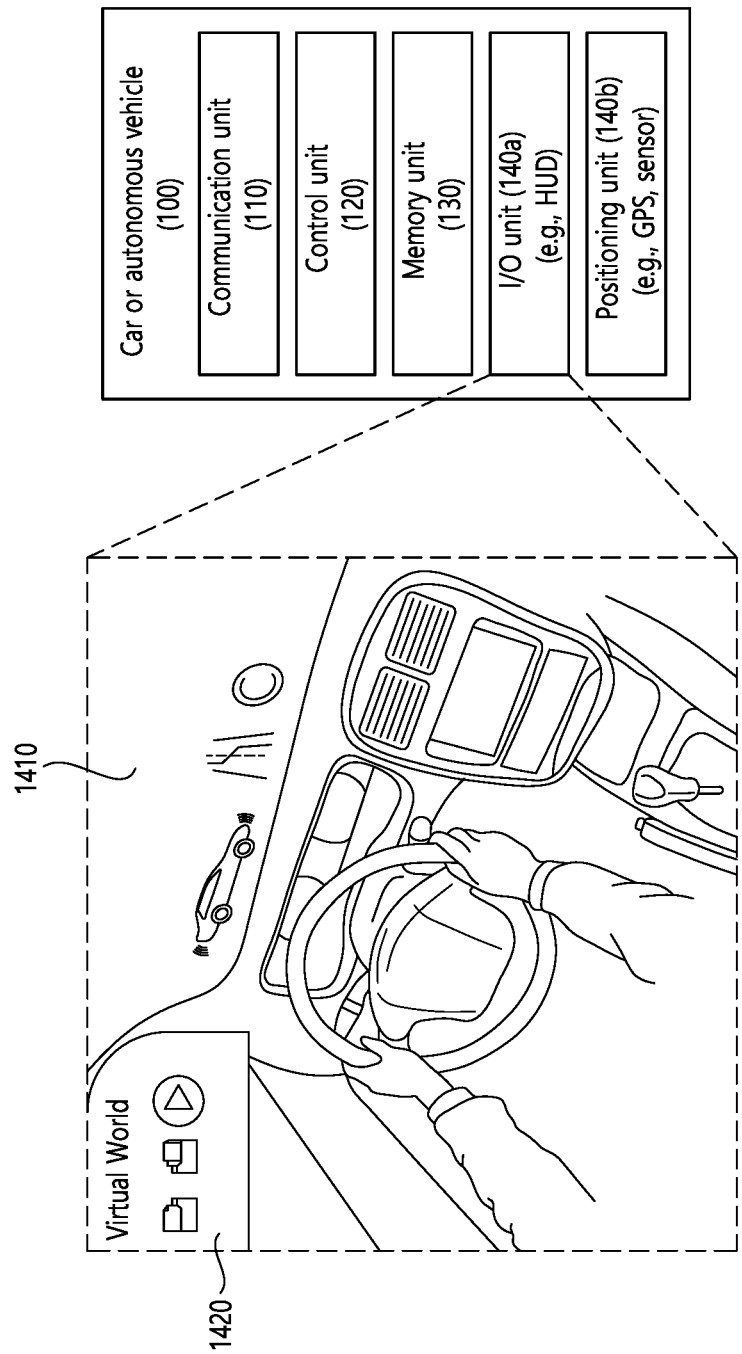
FIG. 24 shows a vehicle, in accordance with an embodiment of the present disclosure.

FIG. 24 shows a vehicle, in accordance with an embodiment of the present disclosure. The vehicle may be implemented as a transport means, an aerial vehicle, a ship, and so on.

Referring to FIG. 24, a vehicle (100) may include a communication unit (110), a control unit (120), a memory unit (130), an I/O unit (140a), and a positioning unit (140b). Herein, the blocks 110~130/140a~140b correspond to blocks 110~130/140 of FIG. 21.

The communication unit (110) may transmit and receive signals (e.g., data and control signals) to and from external devices such as other vehicles or BSs. The control unit (120) may perform various operations by controlling constituent elements of the vehicle (100). The memory unit (130) may store data/parameters/programs/code/commands for supporting various functions of the vehicle (100). The I/O unit (140a) may output an AR/VR object based on information within the memory unit (130). The I/O unit (140a) may include an HUD. The positioning unit (140b) may obtain information on the position of the vehicle (100). The position information may include information on an absolute position of the vehicle (100), information on the position of the vehicle (100) within a traveling lane, acceleration information, and information on the position of the vehicle (100) from a neighboring vehicle. The positioning unit (140b) may include a GPS and various sensors.

As an example, the communication unit (110) of the vehicle (100) may receive map information and traffic information from an external server and store the received information in the memory unit (130). The positioning unit (140b) may obtain the vehicle position information through the GPS and various sensors and store the obtained information in the memory unit (130). The control unit (120) may generate a virtual object based on the map information, traffic information, and vehicle position information and the I/O unit (140a) may display the generated virtual object in a window in the vehicle (1410, 1420). The control unit (120) may determine whether the vehicle (100) normally drives within a traveling lane, based on the vehicle position information. If the vehicle (100) abnormally exits from the traveling lane, the control unit (120) may display a warning on the window in the vehicle through the I/O unit (140a). In addition, the control unit (120) may broadcast a warning message regarding driving abnormity to neighboring vehicles through the communication unit (110). According to situation, the control unit (120) may transmit the vehicle position information and the information on driving/vehicle abnormality to related organizations.

Figure 25:
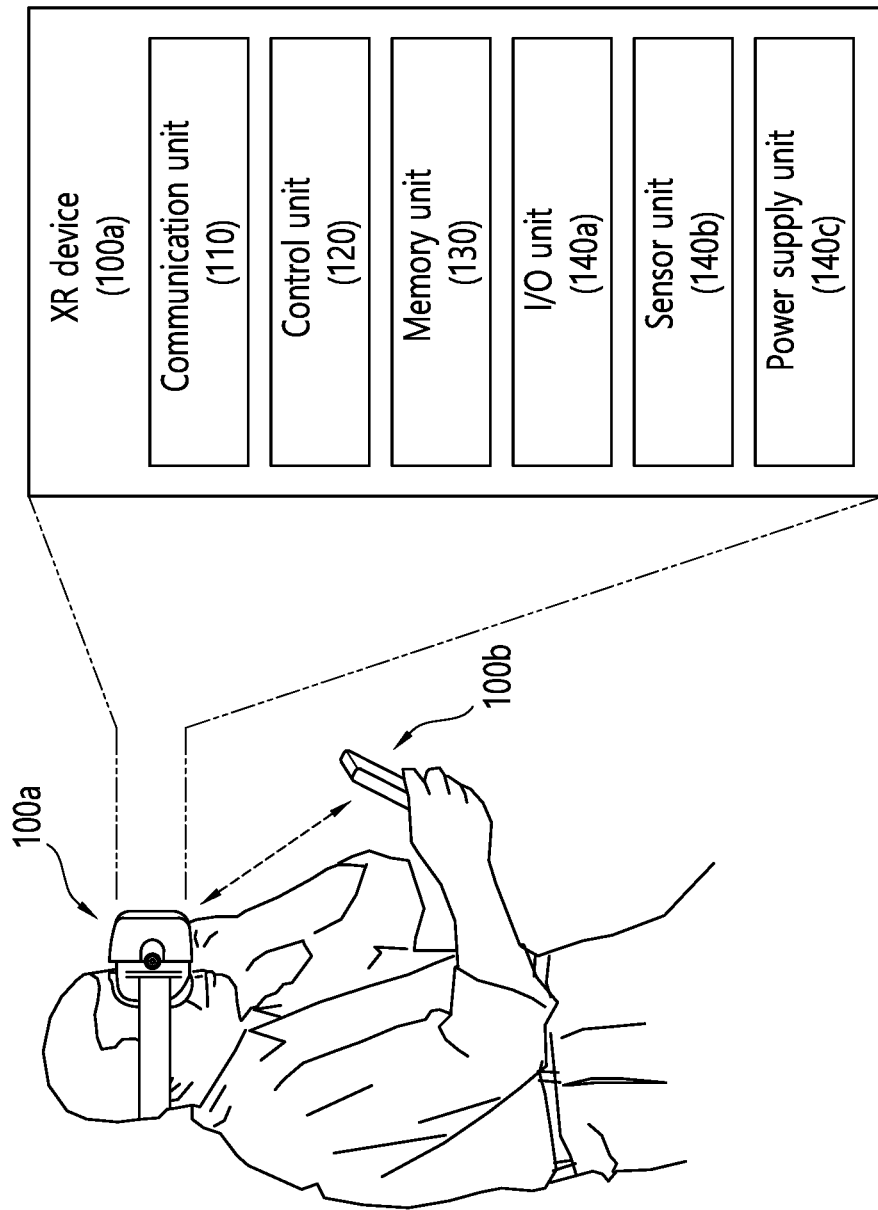
FIG. 25 shows an XR device, in accordance with an embodiment of the present disclosure.

FIG. 25 shows an XR device, in accordance with an embodiment of the present disclosure. The XR device may be implemented by an HMD, an HUD mounted in a vehicle, a television, a smartphone, a computer, a wearable device, a home appliance, a digital signage, a vehicle, a robot, and so on.

Referring to FIG. 25, an XR device (100a) may include a communication unit (110), a control unit (120), a memory unit (130), an I/O unit (140a), a sensor unit (140b), and a power supply unit (140c). Herein, the blocks 110~130/140a~140c correspond to the blocks 110~130/140 of FIG. 31, respectively.

The communication unit (110) may transmit and receive signals (e.g., media data and control signals) to and from external devices such as other wireless devices, hand-held devices, or media servers. The media data may include video, images, and sound. The control unit (120) may perform various operations by controlling constituent elements of the XR device (100a). For example, the control unit (120) may be configured to control and/or perform procedures such as video/image acquisition, (video/image) encoding, and metadata generation and processing. The memory unit (130) may store data/parameters/programs/code/commands needed to drive the XR device (100a)/generate XR object. The I/O unit (140a) may obtain control information and data from the exterior and output the generated XR object. The I/O unit (140a) may include a camera, a microphone, a user input unit, a display unit, a speaker, and/or a haptic module. The sensor unit (140b) may obtain an XR device state, surrounding environment information, user information, and so on. The sensor unit (140b) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit (140c) may supply power to the XR device (100a) and include a wired/wireless charging circuit, a battery, and so on.

For example, the memory unit (130) of the XR device (100a) may include information (e.g., data) needed to generate the XR object (e.g., an AR/VR/MR object). The I/O unit (140a) may receive a command for manipulating the XR device (100a) from a user and the control unit (120) may drive the XR device (100a) according to a driving command of a user. For example, when a user desires to watch a film or news through the XR device (100a), the control unit (120) transmits content request information to another device (e.g., a hand-held device 100b) or a media server through the communication unit (130). The communication unit (130) may download/stream content such as films or news from another device (e.g., the hand-held device 100b) or the media server to the memory unit (130). The control unit (120) may control and/or perform procedures such as video/image acquisition, (video/image) encoding, and metadata generation/processing with respect to the content and generate/output the XR object based on information on a surrounding space or a real object obtained through the I/O unit (140a)/sensor unit (140b).

The XR device (100a) may be wirelessly connected to the hand-held device (100b) through the communication unit (110) and the operation of the XR device (100a) may be controlled by the hand-held device (100b). For example, the hand-held device (100b) may operate as a controller of the XR device (100a). To this end, the XR device (100a) may obtain information on a 3D position of the hand-held device (100b) and generate and output an XR object corresponding to the hand-held device (100b).

Figure 26:
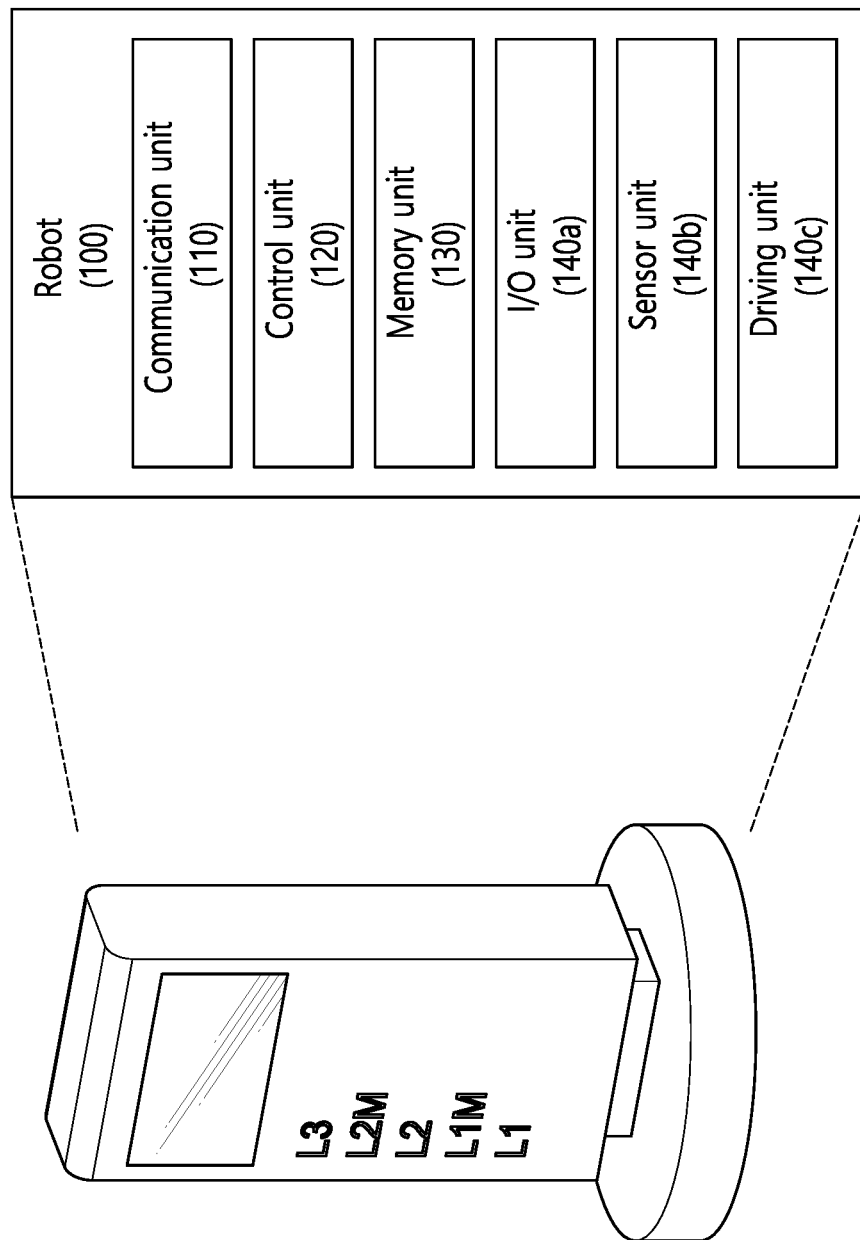
FIG. 26 shows a robot, in accordance with an embodiment of the present disclosure.

FIG. 26 shows a robot, in accordance with an embodiment of the present disclosure. The robot may be categorized into an industrial robot, a medical robot, a household robot, a military robot, and so on, according to a used purpose or field.

Referring to FIG. 26, a robot (100) may include a communication unit (110), a control unit (120), a memory unit (130), an I/O unit (140a), a sensor unit (140b), and a driving unit (140c). Herein, the blocks 110~130/140a~140c correspond to the blocks 110~130/140 of FIG. 21, respectively.

The communication unit (110) may transmit and receive signals (e.g., driving information and control signals) to and from external devices such as other wireless devices, other robots, or control servers. The control unit (120) may perform various operations by controlling constituent elements of the robot (100). The memory unit (130) may store data/parameters/programs/code/commands for supporting various functions of the robot (100). The I/O unit (140a) may obtain information from the exterior of the robot (100) and output information to the exterior of the robot (100). The I/O unit (140a) may include a camera, a microphone, a user input unit, a display unit, a speaker, and/or a haptic module. The sensor unit (140b) may obtain internal information of the robot (100), surrounding environment information, user information, and so on. The sensor unit (140b) may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, and so on. The driving unit (140c) may perform various physical operations such as movement of robot joints. In addition, the driving unit (140c) may cause the robot (100) to travel on the road or to fly. The driving unit (140c) may include an actuator, a motor, a wheel, a brake, a propeller, and so on.

FIG. 27 shows an AI device, in accordance with an embodiment of the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, and so on.

Referring to FIG. 27, an AI device (100) may include a communication unit (110), a control unit (120), a memory unit (130), an I/O unit (140a/140b), a learning processor unit (140c), and a sensor unit (140d). The blocks 110~130/140a~140d correspond to blocks 110~130/140 of FIG. 21, respectively.

The communication unit (110) may transmit and receive wired/radio signals (e.g., sensor information, user input, learning models, or control signals) to and from external devices such as other AI devices (e.g., 100x, 200,400 of FIG. 18) or an AI server (e.g., 400 of FIG. 18) using wired/wireless communication technology. To this end, the communication unit (110) may transmit information within the memory unit (130) to an external device and transmit a signal received from the external device to the memory unit (130).

The control unit (120) may determine at least one feasible operation of the AI device (100), based on information which is determined or generated using a data analysis algorithm or a machine learning algorithm. The control unit (120) may perform an operation determined by controlling constituent elements of the AI device (100). For example, the control unit (120) may request, search, receive, or use data of the learning processor unit (140c) or the memory unit (130) and control the constituent elements of the AI device (100) to perform a predicted operation or an operation determined to be preferred among at least one feasible operation. The control unit (120) may collect history information including the operation contents of the AI device (100) and operation feedback by a user and store the collected information in the memory unit (130) or the learning processor unit (140c) or transmit the collected information to an external device such as an AI server (400 of FIG. 19). The collected history information may be used to update a learning model.

The memory unit (130) may store data for supporting various functions of the AI device (100). For example, the memory unit (130) may store data obtained from the input unit (140a), data obtained from the communication unit (110), output data of the learning processor unit (140c), and data obtained from the sensor unit (140). The memory unit (130) may store control information and/or software code needed to operate/drive the control unit (120).

The input unit (140a) may obtain various types of data from the exterior of the AI device (100). For example, the input unit (140a) may obtain learning data for model learning, and input data to which the learning model is to be applied. The input unit (140a) may include a camera, a microphone, and/or a user input unit. The output unit (140b) may generate output related to a visual, auditory, or tactile sense. The output unit (140b) may include a display unit, a speaker, and/or a haptic module. The sensing unit (140) may obtain at least one of internal information of the AI device (100), surrounding environment information of the AI device (100), and user information, using various sensors. The sensor unit (140) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit (140c) may learn a model consisting of artificial neural networks, using learning data.

The learning processor unit (140c) may perform AI processing together with the learning processor unit of the AI server (400 of FIG. 18). The learning processor unit (140c) may process information received from an external device through the communication unit (110) and/or information stored in the memory unit (130). In addition, an output value of the learning processor unit (140c) may be transmitted to the external device through the communication unit (110) and may be stored in the memory unit (130).

The claims set forth herein can be combined in a variety of ways. For example, the technical features of the method claims of the present specification may be combined to be implemented as a device, and the technical features of the device claims of the present specification may be combined to be implemented as a method. In addition, the technical features of the method claims of the present specification and the technical features of the device claims may be combined to be implemented as a device, and the technical features of the method claims of the present specification and the technical features of the device claims may be combined to be implemented as a method.

What is claimed is:

1. A power control method performed by a first wireless device in a
    wireless communication system, the method comprising:
    measuring self-interference for uplink reception of the first wireless device; and
    transmitting power control request information to a second wireless device, based on that the self-interference exceeds an allowable range,
    wherein the power control request information comprises power control information for uplink transmission of the first wireless device.

2. The method of claim 1, wherein the self-interference is measured based on at least one of reference signal received power (RSRP), reference signal received quality (RSRQ), and received signal strength indicator (RSSI).

3. The method of claim 1,
    wherein the first wireless device receives a specific signal from the second wireless device after transmitting the power control request information, and
    wherein specific transmit power of the specific signal is less than transmit power of a signal received by the first wireless device before transmitting the power control request information.

4. The method of claim 3, wherein the specific signal is a signal other than a synchronization signal block, a random access channel (RACH), a periodic cell state information-reference signal (CSI-RS), and a scheduling request (SR).

5. The method of claim 1, wherein the first wireless device is a terminal in which a full-duplex-based operation is configured, and the second wireless device is a base station.

6. The method of claim 1,
    wherein the first wireless device is an IAB node in which a full-duplex-based operation is configured, and the second wireless device is a parent IAB node of the first wireless device,
    wherein the uplink reception is an operation in which a mobile termination (MT) of the IAB node receives a signal from a distribution unit (DU) of the parent IAB node, and
    wherein the uplink transmission is an operation in which the MT of the IAB node transmits a signal to the DU of the parent IAB node.

7. A first wireless device performing power control, the device comprising:
one or more memoires storing instructions;
one or more transceivers; and
one or more processors coupling the one or more memoires and the one or more transceivers, wherein the one or more processors execute the instructions to:
measure self-interference for uplink reception of the first wireless device; and
transmit power control request information to a second wireless device, based on that the self-interference exceeds an allowable range,
wherein the power control request information comprises power control information for uplink transmission of the first wireless device.

8. A power control method performed by a first wireless device in a wireless communication system, the method comprising:
receiving power control request information from a second wireless device; and
performing power control, based on the power control request information,
wherein the power control request information comprises transmit power information of transmission performed for the first wireless device by the second wireless device.

9. The method of claim 8,
wherein the power control comprises a first configuration of first transmit power used in downlink transmission of the first wireless device, and
wherein the first transmit power decreases based on the first configuration.

10. The method of claim 9, wherein the first configuration is not applied to at least one of a resource for transmission of a synchronization signal block and a resource scheduled for random access channel (RACH) occasion, periodic cell state information-reference signal (CSI-RS) transmission, and scheduling request (SR) reception.

11. The method of claim 8, wherein the first wireless device is a device in which a full-duplex operation is configured.

12. The method of claim 8,
wherein the power control comprises a second configuration of second transmit power used in uplink transmission of the second wireless device, and the second transmit power increases based on the second configuration, and
wherein the first wireless device transmits information reporting the second configuration to the second transmission device.

13. The method of claim 8, wherein the first wireless device is an IAB node, and the second wireless device is a child IAB node of the first wireless device.

14. The method of claim 8, wherein the first wireless device is a base station, and the second wireless device is a terminal.

* * * * *